US012645036B2

(12) United States Patent
Giraud et al.

(10) Patent No.: US 12,645,036 B2
(45) Date of Patent: Jun. 2, 2026

(54) CABLE COVERINGS FOR LOCAL CONVERGENCE POINTS AND FIBER OPTIC ENCLOSURES

(71) Applicant: CORNING RESEARCH & DEVELOPMENT CORPORATION, Corning, NY (US)

(72) Inventors: William Julius McPhil Giraud, Azle, TX (US); Karyne Poissant Prevratil, Fort Worth, TX (US); Diana Rodriguez, Mansfield, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 322 days.

(21) Appl. No.: 18/242,581

(22) Filed: Sep. 6, 2023

(65) Prior Publication Data

US 2024/0111102 A1      Apr. 4, 2024

Related U.S. Application Data

(60) Provisional application No. 63/412,031, filed on Sep. 30, 2022.

(51) Int. Cl.
    *G02B 6/38*      (2006.01)
    *G02B 6/44*      (2006.01)
(52) U.S. Cl.
    CPC ......... *G02B 6/3849* (2013.01); *G02B 6/3897* (2013.01); *G02B 6/44465* (2023.05)

(58) Field of Classification Search
    CPC .......................... G02B 6/3849; G02B 6/44465
    See application file for complete search history.

(56) References Cited

U.S. PATENT DOCUMENTS

| | | | |
|---|---|---|---|
| 4,379,473 A | 4/1983 | Kunze | |
| 4,900,596 A | 2/1990 | Peacock | |
| 10,955,621 B2 | 3/2021 | Prevratil et al. | |
| 2012/0195019 A1* | 8/2012 | Keith ..................... | H04Q 1/023 |
| | | | 361/827 |
| 2021/0116666 A1 | 4/2021 | Kaml et al. | |

FOREIGN PATENT DOCUMENTS

| | | | |
|---|---|---|---|
| JP | H06152177 A | * | 5/1994 |
| WO | 2019/010291 A1 | | 1/2019 |
| WO | 2019/079425 A1 | | 4/2019 |
| WO | 2019/079460 A1 | | 4/2019 |

OTHER PUBLICATIONS

English translation of JP H06152177A (Year: 1994).*
Extended European Search Report, European patent application No. 23200202.2, dated Apr. 2, 2024; 12 pages; European Patent Office.
Farnell Multicomppro: "Zipper Braided Wrap", 2022, 1 page.
Reichelt: "Geflechtschlauch-mit-reissverschluss", 2020, 1 page.
Wolfskin: "Beratung von Jack Wolfskin Experten", 2020, 2 pages.
Wrap-It Storage: "Cable Sleeve—Zipper Closure", 2020, pp. 1-16.

* cited by examiner

*Primary Examiner* — Sung H Pak
(74) *Attorney, Agent, or Firm* — Kapil U. Banakar

(57) ABSTRACT

In general, the present disclosure relates to a cable covering for use on distribution cabinets and the corresponding methods of using and assembling the cable covering onto the distribution cabinets.

17 Claims, 22 Drawing Sheets

CABLE COVERINGS FOR LOCAL CONVERGENCE POINTS AND FIBER OPTIC ENCLOSURES

PRIORITY APPLICATION

This application claims the benefit of priority of U.S. Provisional Application No. 63/412,031, filed on Sep. 30, 2022, the content of which is relied upon and incorporated herein by reference in its entirety.

FIELD

The technology of the disclosure relates to cable coverings and more particularly, to cable coverings for local convergence points and fiber optic enclosures.

BACKGROUND

Large amounts of data and other information transmitted over the internet has led businesses and other organizations to develop large scale data centers for organizing, processing, storing, and/or disseminating large amounts of data. Data centers contain a wide range of communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. May modern data centers include multi-building campuses having, for example, one primary or main building and a number of auxiliary buildings in close proximity to the main building. All the buildings on the campus are interconnected by a local fiber optic network. More particularly, each of the auxiliary buildings are typically connected to the main building by one or more high fiber-count optical cables referred to as "trunk cables". Each trunk cable may include thousands of optical fibers. Indeed, fiber counts of 3,456 or higher are now common.

To provide optical connectivity within a building, the optical fibers of a trunk cable are typically spliced to optical fibers of indoor distribution cables. The splices may be stored and organized in a splice cabinet from which the indoor distribution cables extend. More specifically, the splice cabinet holds numerous splice trays that each receives a group of optical fibers from the trunk cable that have been spliced to a group of optical fibers associated with the indoor distribution cables. Fusion splicing is commonly used as the primary technique for splicing the two groups of optical fibers together before the splices are stored and organized in the splice trays. The indoor distribution cables exit the splice cabinet and extend to desired locations within the building, such as to designated rows of equipment racks. Connections to the communication equipment in the equipment racks are ultimately made by the indoor distribution cables or cables that are part of a structured cabling system for the building.

The amount of labor and time for connecting a trunk cable to the communication equipment in the main building on a data center campus is significant. One aspect of the installation process is connecting cables to the distribution cabinets of the data center. In some aspects, the cables enter the cabinets from the top or bottom of the cabinet, and in these cases, there needs to be a sealant or sealing method to protect the cables from debris or dust that may be present in the data center application. Previous sealants or sealing methods may be sufficient with low volumes of cables; however, continued improvement in this area is needed as the need for a greater volume of cabling within the data centers continues.

SUMMARY

In general, the present disclosure relates to a cable covering for use on distribution cabinets and the corresponding methods of using and assembling the cable covering onto the distribution cabinets.

In one embodiment, a cable covering is provided. The cable covering comprising: a sheet having a top portion, a bottom portion, a first edge, and a second edge coupled to the first edge; a string embedded within a top portion of the sheet, wherein the string is operably coupled to the top portion of the sheet; a fastener embedded within the bottom portion of the sheet; and a second fastener attached to the first edge and the second edge of the sheet, wherein the second fastener couples the first edge to the second edge to close the cable covering.

In another embodiment, the string can be tensioned to tie a knot to tighten the top portion of the sheet. In another embodiment, the first fastener is a magnet and the second fastener is a zipper. In another embodiment, the sheet is made of an aramid material. In another embodiment, the cable covering comprises a plurality of cable coverings coupled to each other. In another embodiment, the plurality of cable coverings comprises: a first side covering; a second side covering; a middle covering positioned between the first side covering and the second side covering, the middle covering coupled to the first side covering and the second side covering.

In one embodiment, a cable covering assembly is provided. The cable covering assembly comprising: a distribution cabinet comprising: a first side wall; a second side wall; and a rear wall coupled to the first side wall and the second side wall; a covering coupled to the distribution cabinet comprising: a sheet having a top portion, a bottom portion, a first edge, and a second edge coupled to the first edge; a string embedded within a top portion of the sheet, wherein the string is operably coupled to the top portion of the sheet; a fastener embedded within the bottom portion of the sheet; and a second fastener attached to the first edge and the second edge of the sheet, wherein the second fastener couples the first edge to the second edge to close the cable covering.

In another embodiment, the covering is coupled to a ramp, the ramp including an opening through which the sheet is fed. In another embodiment, the string can be tensioned to tie a knot to tighten the top portion of the sheet. In another embodiment, the first fastener is a magnet and the second fastener is a zipper. In another embodiment, the sheet is made of an aramid material. In another embodiment, the cable covering comprises a plurality of cable coverings coupled to each other, wherein the plurality of cable coverings comprises: a first side covering; a second side covering; a middle covering positioned between the first side covering and the second side covering, the middle covering coupled to the first side covering and the second side covering. In another embodiment, the cable covering assembly further comprising a plurality of trunk cables inserted into the distribution cabinet, wherein the plurality of trunk cables is separated into a first group, a second group, and a third group. In another embodiment, the first group of trunk cables corresponds to the first side covering, the second group of trunk cables corresponds to the middle covering, and the third group of trunk cables corresponds to the second side covering.

In one embodiment, a method of assembling a cable covering assembly, wherein the cable covering assembly comprises: a cable covering comprising: a sheet having a top portion, a bottom portion, a first edge, and a second edge coupled to the first edge; a string embedded within a top portion of the sheet, wherein the string is operably coupled to the top portion of the sheet; a fastener embedded within the bottom portion of the sheet; and a second fastener attached to the first edge and the second edge of the sheet is provided. The method comprising: inserting the cable covering onto a ramp; coupling the ramp and the cable covering to a distribution cabinet; inserting a plurality of trunk cables into distribution cabinet; closing the cable covering around the plurality of trunk cables by actuating the second fastener to couple the first edge to the second edge to close the cable covering; and tensioning the string and tying a knot to tighten the cable covering around the plurality of trunk cables.

In another embodiment, the cable covering comprises a plurality of cable coverings coupled to each other, wherein the plurality of cable coverings comprises: a first side covering; a second side covering; a middle covering positioned between the first side covering and the second side covering, the middle covering coupled to the first side covering and the second side covering. In another embodiment, the plurality of trunk cables are separated into a first group, a second group, and a third group; wherein the first group of trunk cables is housed in the first side covering, the second group of trunk cables is housed in the middle covering, and the third group of trunk cables is housed in the second side covering.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Various embodiments will be clarified by examples in the description below. In general, the present disclosure relates to a cable covering for use on distribution cabinets and the corresponding methods of using and assembling the cable covering onto the distribution cabinets.

To facilitate discussion and provide context, an exemplary environment and use for high fiber-count cables will first be described. A description of an example distribution cabinet and corresponding cable coverings in accordance with the present disclosure will follow.

Example Environment (Data Center Cable Network)

Figure 1:
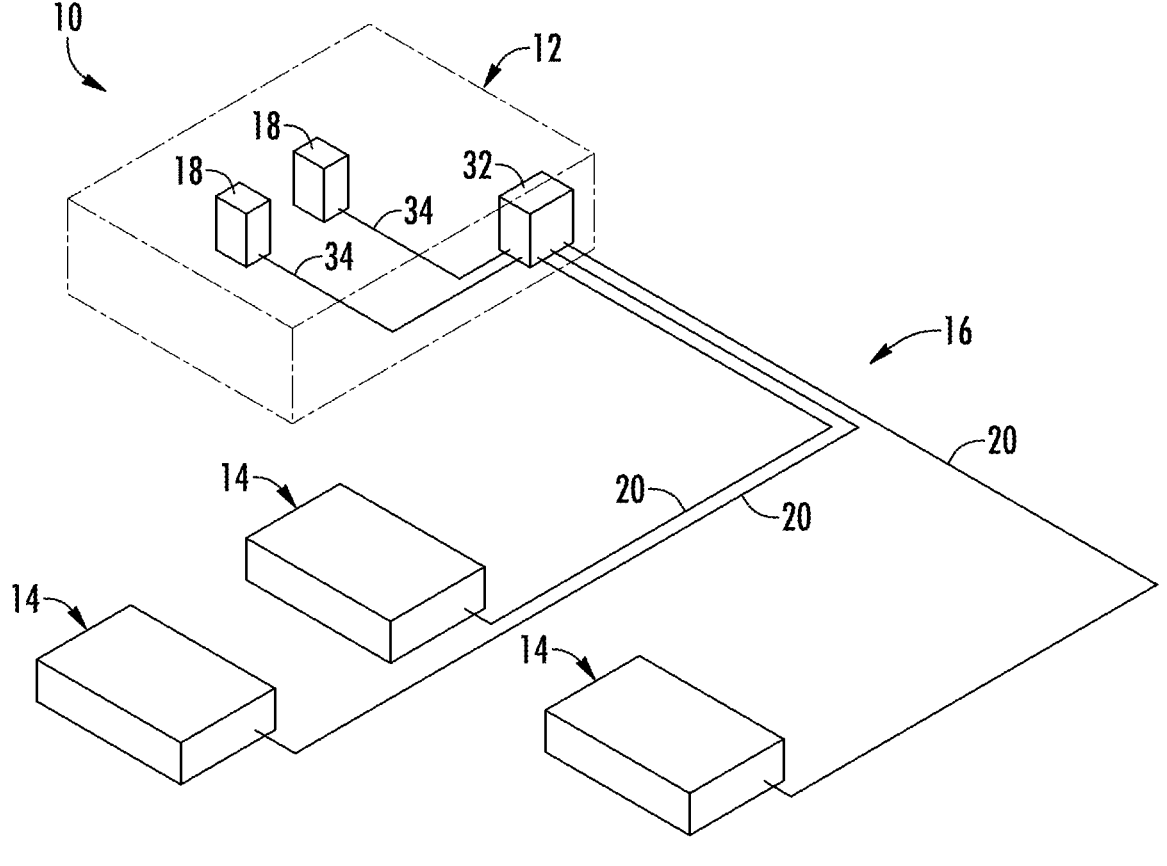
FIG. 1 is a schematic illustration of a data center campus interconnect in accordance with the present disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows communication equipment 18 in the main building 12 to communicate with various communication equipment (not shown) in the auxiliary buildings 14. In the exemplary embodiment shown, the local fiber optic network 16 includes trunk cables 20 extending between the main building 12 and each of the auxiliary buildings 14.

The trunk cables 20 may be similar to any of the cables described in International Patent Application Publication No. WO 2019/010291 A1 ("the '291 publication"), the disclosure of which is fully incorporated herein by reference.

The trunk cables 20 from the auxiliary buildings 14 are routed to a distribution cabinet 32 (also referred to as "distribution enclosure 32") housed in the main building 12. In alternative embodiments, there may be multiple distribution cabinets 32 in the main building for receiving the trunk cables 20. Thus, there may be one or more distribution cabinets 32.

Within the main building 12, a plurality of indoor fiber optic cables 34 ("indoor cables 34") are routed between the communication equipment 18 and the one or more distribution cabinets 32. In an exemplary embodiment, each of the indoor cables 34 may be configured to carry a preselected number of optical fibers. By way of example and without limitation, each indoor cable 34 may be configured to carry 144 or 288 of the optical fibers. It should be recognized, however, that more or less optical fibers may be carried by each of the indoor cables 34.

Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 32 in one of the auxiliary buildings 14 in a manner similar to that described above. Furthermore, each of the auxiliary buildings 14 may include indoor cables 34 that extend between communication equipment 18 and the one or more distribution cabinets 32 of the auxiliary building 14.

Figure 2:
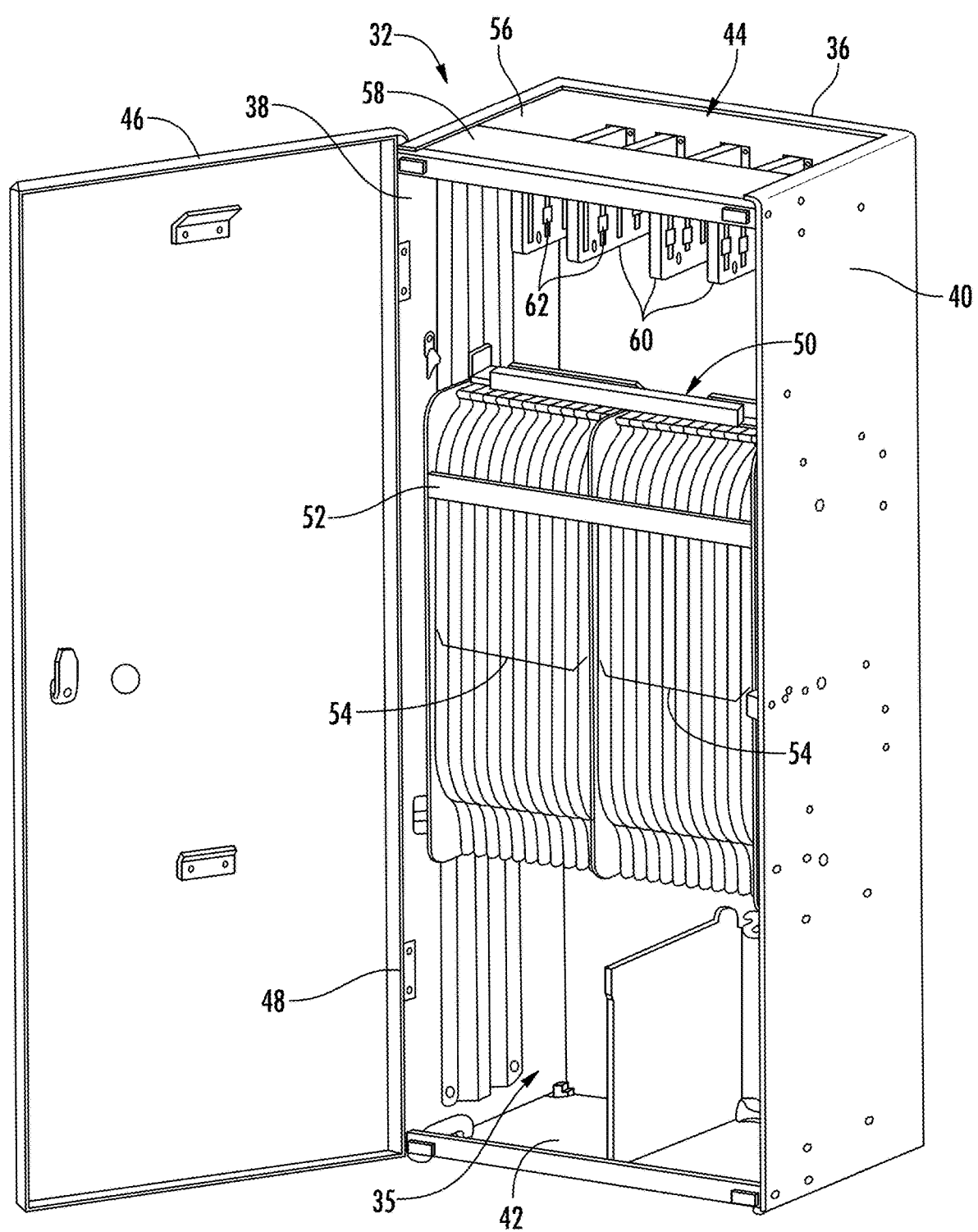
FIG. 2 is a perspective view of a distribution cabinet used in the data center campus of FIG. 1.

Referring now to FIG. 2, FIG. 2 illustrates an embodiment of a distribution cabinet 32 to be used in accordance with the present disclosure. The distribution cabinet 32 may be similar to embodiments described in PCT Patent Application Publication Nos. WO 2019/079460 A1 ("the '460 publication") and WO 2019/079425 A1 ("the '425 publication"), the disclosures of which of fully incorporated herein by reference. Indeed, FIG. 2 generally corresponds to FIG. 1 of the '425 publication such that reference can be made to the '425 publication for a more complete understanding of aspects not discussed below. Only a brief overview is provided below for reference.

As shown in FIG. 2, the distribution cabinet 32 includes various walls that are assembled together to define an interior volume 35. In particular, the distribution cabinet 32 includes a rear wall 36, a first side wall 38 and a second side wall 40 coupled to opposite sides of the rear wall 36, and a lower wall 42 and an upper wall 44 respectively coupled to a top and bottom of each of the rear wall 36, the first side wall 38, and the second side wall 40. A front door 46 is pivotally coupled to the first side wall 38 (e.g., by hinges 48) to provide selective access to the interior volume 35. The distribution cabinet 32 also includes a tray assembly 50 within the interior volume 35 that comprises a tray housing 52 (or "carriage 52") pivotally coupled to the distribution cabinet 32 and a plurality of trays 54 coupled to the tray housing 52. The tray housing 52 may pivot/rotate outward from the interior volume 35 to facilitate access to the trays 54. The trays 54 themselves may pivot or otherwise move relative to the tray housing 52 (including being removable from the tray housing 52) to provide additional access to any given tray 54.

Figure 2A:
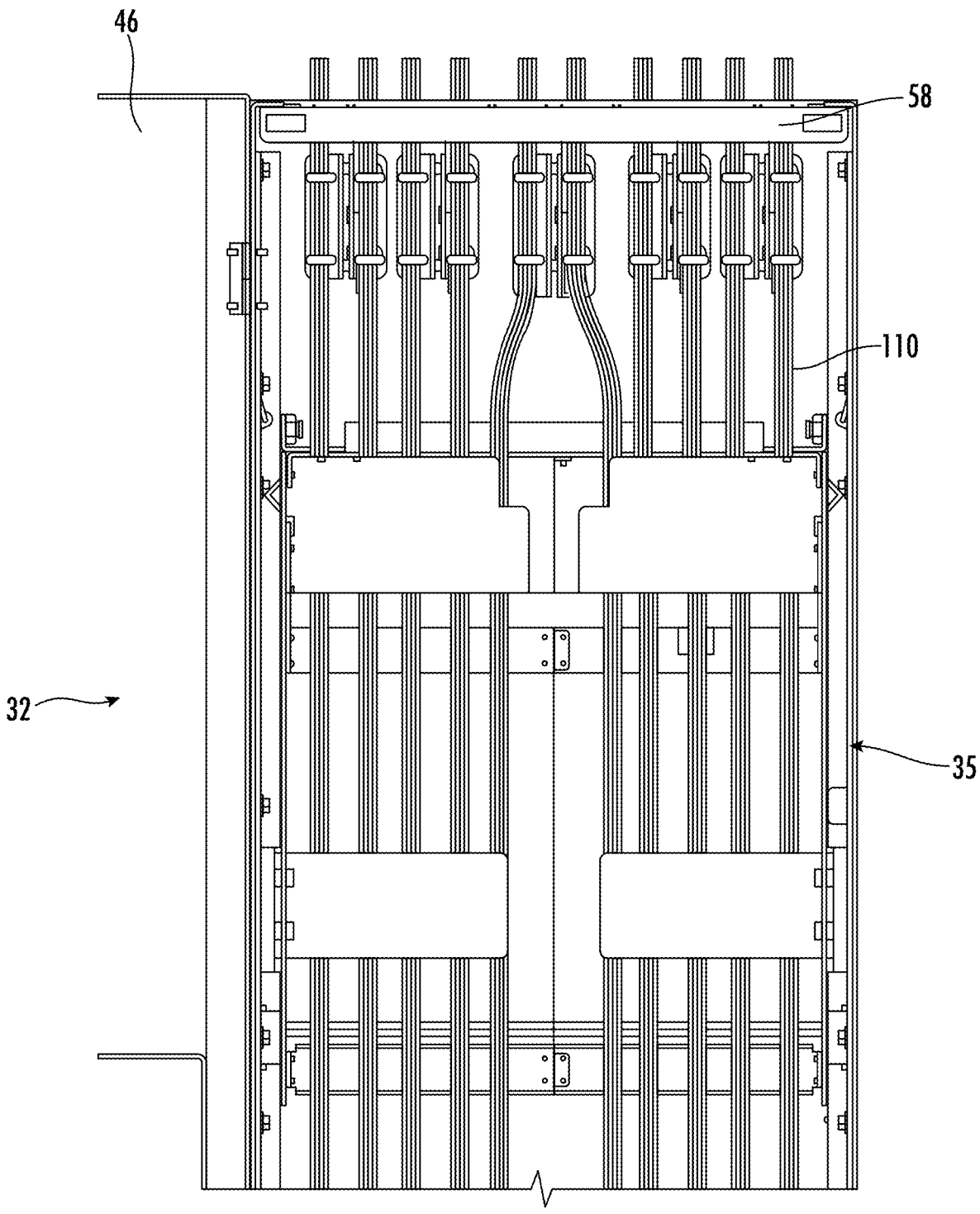
FIG. 2A is a front view of the distribution cabinet of FIG. 2 illustrating trunk cables inserted into the distribution cabinet.

Various features may be provided in the distribution cabinet 32 to assist with receiving the pre-terminated trunk cable 110. Although FIG. 2 illustrates a transparent rear plate 56 without openings as a rear portion of the upper wall 44, such a plate may include different sized openings for different types of cables as shown in FIG. 2A. For example, there may be openings sized to receive the larger, high fiber-count pre-terminated trunk cables 110, and openings sized to receive the relative smaller fiber-count indoor cables 34. A front plate 58 defining a front portion of the upper wall 44 may also be removable to assist with accessing the pre-terminated trunk cable 110 and other cables as they are routed into the distribution cabinet 32 (e.g., through the openings in the rear plate 56, if present). Additionally, the distribution cabinet 32 may include brackets 60 below the rear plate 56 that serve as mounting locations for the pre-terminated trunk cable 110 and other cables. Apertures 62 or other mounting features may be provided on the brackets 60 for cooperating with complementary mounting features of clips (not shown), which may be integral with the cables (e.g., part of the furcation body 114) or mounted to the cables.

Figure 3:
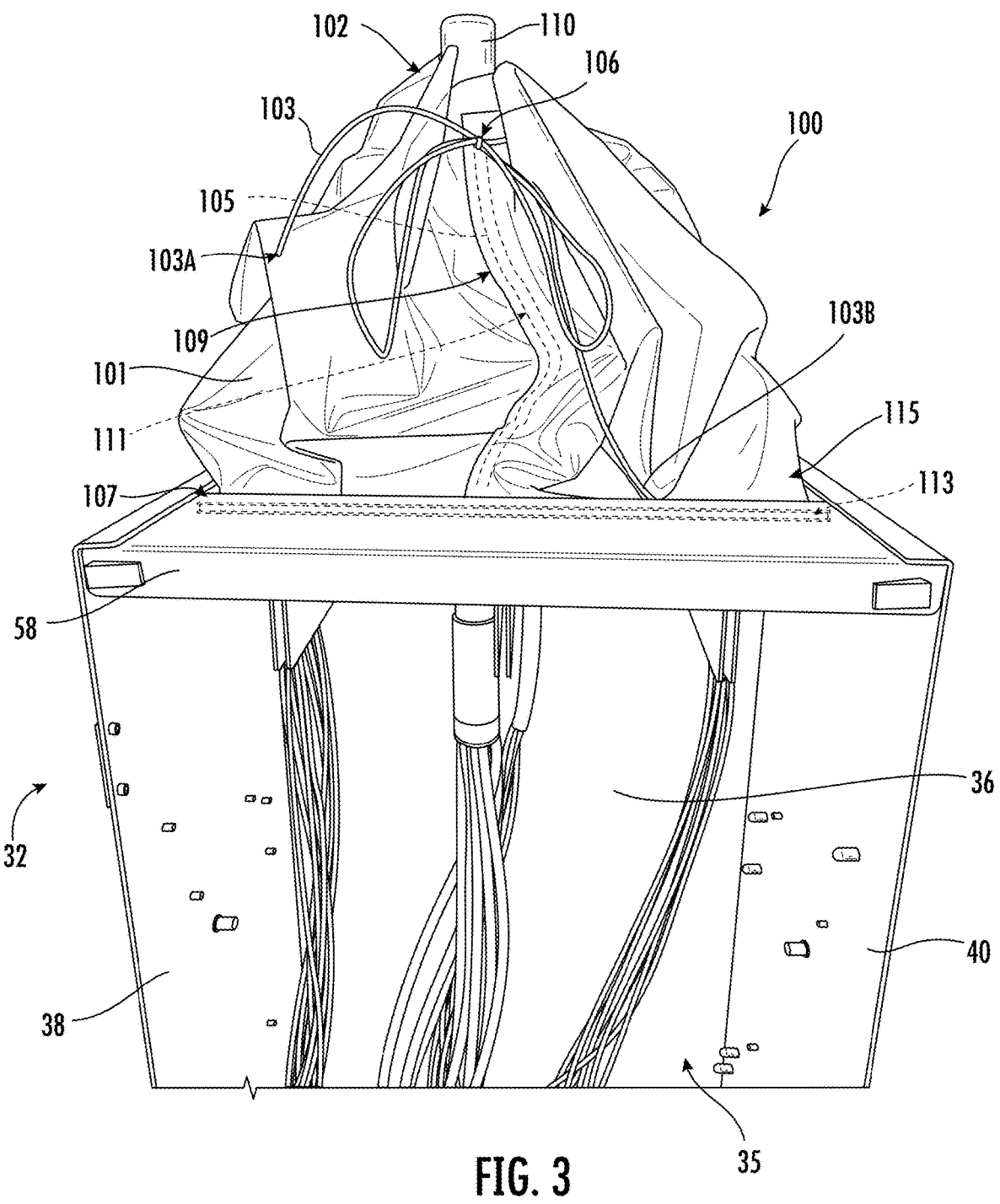
FIG. 3 is a perspective view of an embodiment of a cable covering installed onto the distribution cabinet of FIG. 2.
Figure 4:
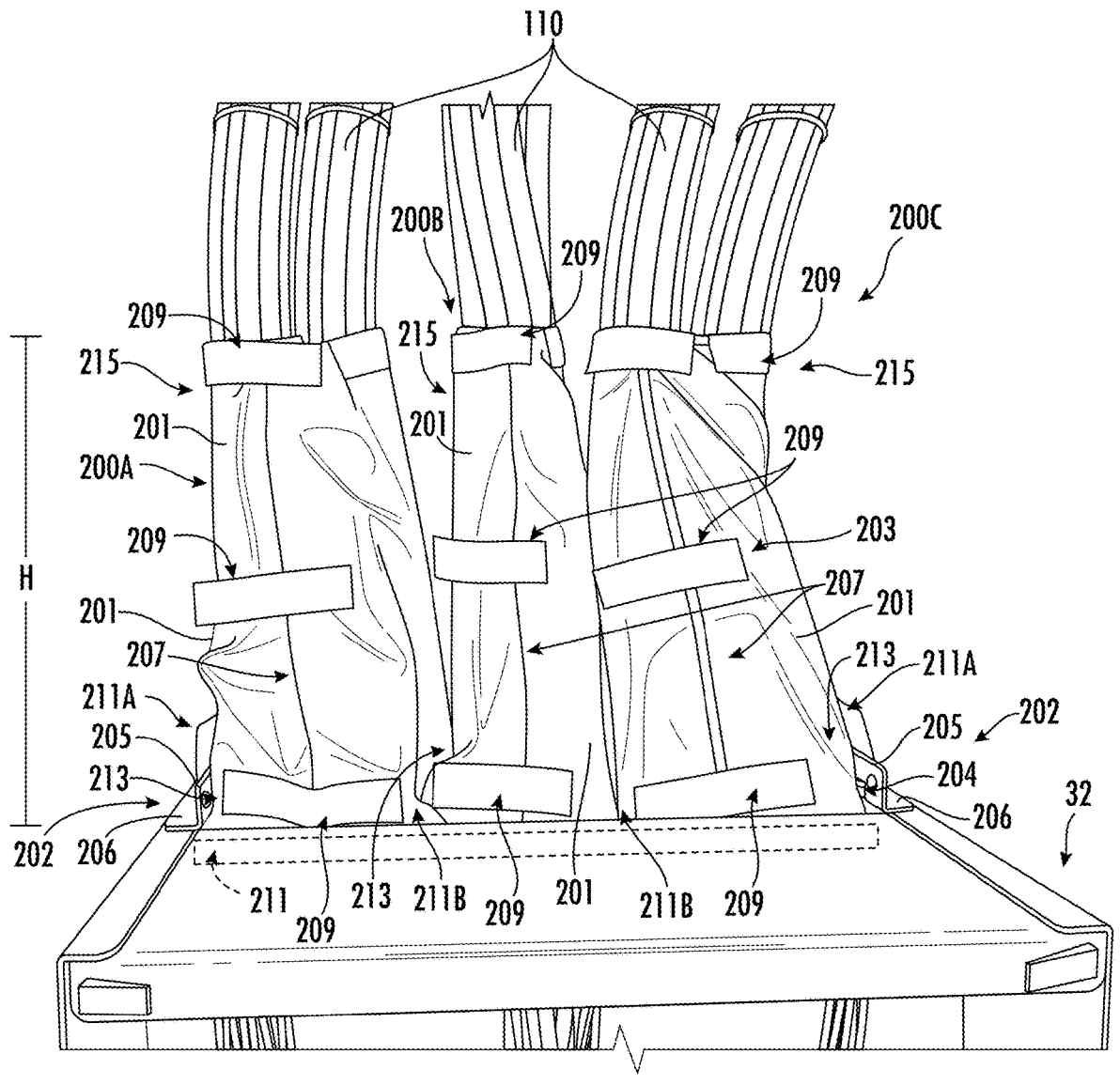
FIG. 4 is a perspective view of an embodiment of a cable covering installed into the distribution cabinet of FIG. 2.
Figure 5:
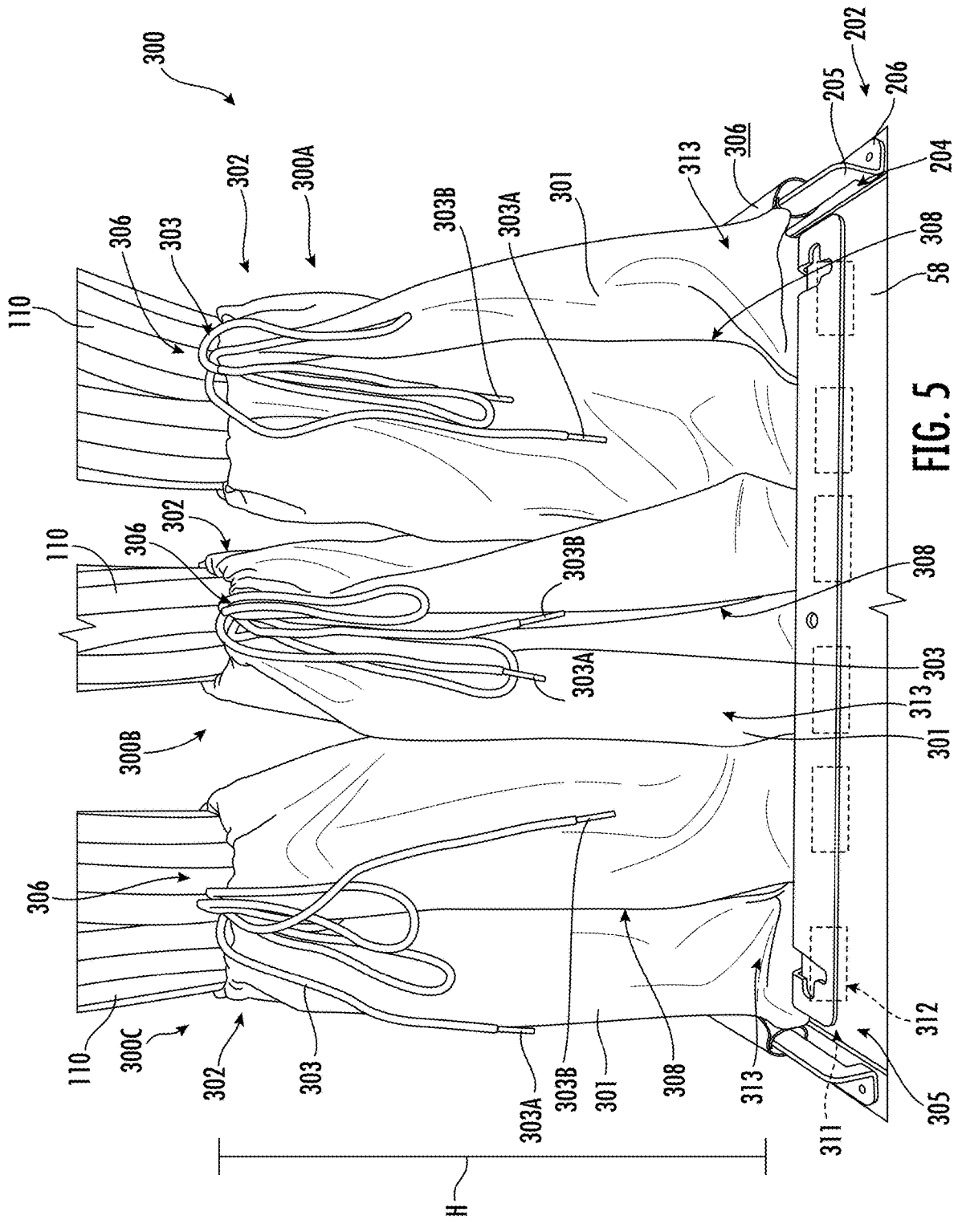
FIG. 5 is a perspective view of an embodiment of a cable covering installed onto the distribution cabinet of FIG. 2.

Referring now to FIGS. 3-5, various embodiments of a cable covering 100, 200, 300 are shown. Cable coverings 100, 200, 300 are configured to encompass trunk cables 110 that are inserted into distribution cabinet 32 such that trunk cables 110 are protected from debris and/or dust.

Covering 100

Referring first to FIG. 3, a first embodiment of cable covering 100 is provided. As shown, cable covering 100 comprises a sheet 101, a string 103 embedded within sheet 101, a self-attachment mechanism 105, and a cabinet attachment mechanism 107. As shown, sheet 101 is configured to wrap around the trunk cables 110 and span the perimeter or circumference of all trunk cables 110 that are inserted into distribution cabinet 32. In some embodiments, sheet 101 is made of an aramid material. However, it is within the scope of the present disclosure that alternate suitable materials such as canvas or cloth like materials, for example, may be used.

As mentioned previously, string 103 is embedded within sheet 101. String 103 is configured to tighten a top portion 102 of sheet 101 such that top portion 102 surrounds a perimeter or circumference of the entering trunk cable(s) 110 to create a seal with trunk cables 110. In particular, string 103 is pulled on both ends 103A, 103B and a knot 106 is tied to tighten sheet 101 around the entering trunk cable(s) 110. In this configuration, top portion 102 provides one layer of sealing protection for the trunk cable(s) 110 to prevent debris or dust from interacting with trunk cables 110 and entering distribution cabinet 32.

As shown in FIG. 3, sheet 101 surrounds entering trunk cables 110 and overlaps on itself to provide an overlap region 109 where the self-attachment mechanism 105 encloses sheet 101 onto entering trunk cable(s) 110. In particular, self-attachment mechanism 105 comprises a coupler 111 that aids in closing sheet 101 as described above. In some embodiments, coupler 111 comprises a fabric fastener (e.g., Velcro) where lineal fabric strips are attached to opposing surfaces of sheet 101 within overlap region 109. However, it is within the scope of the present disclosure that alternate suitable fastening methods may be used, such as hook and loop fasteners, hook and pile fasteners, touch fasteners, or the like, for example.

Cabinet attachment mechanism 107 comprises a fastener 113 located on a bottom portion 115 of sheet 101. Fastener 113 of cabinet attachment mechanism 107 is configured to attach covering 100 to distribution cabinet 32. In particular, in some embodiments, fastener 113 comprises a fabric fastener where lineal fabric strips are attached to the bottom portion 115 of sheet 101 and to rear wall 36, first side wall 38, second side wall 40, and front plate 58. In this embodiment, the lineal strips applied onto bottom portion 115 of sheet 101 are applied onto the corresponding lineal strip of rear wall 36, first side wall 38, second side wall 40, and front plate 58 to thereby couple covering 100 to distribution cabinet 32.

Figure 3A:
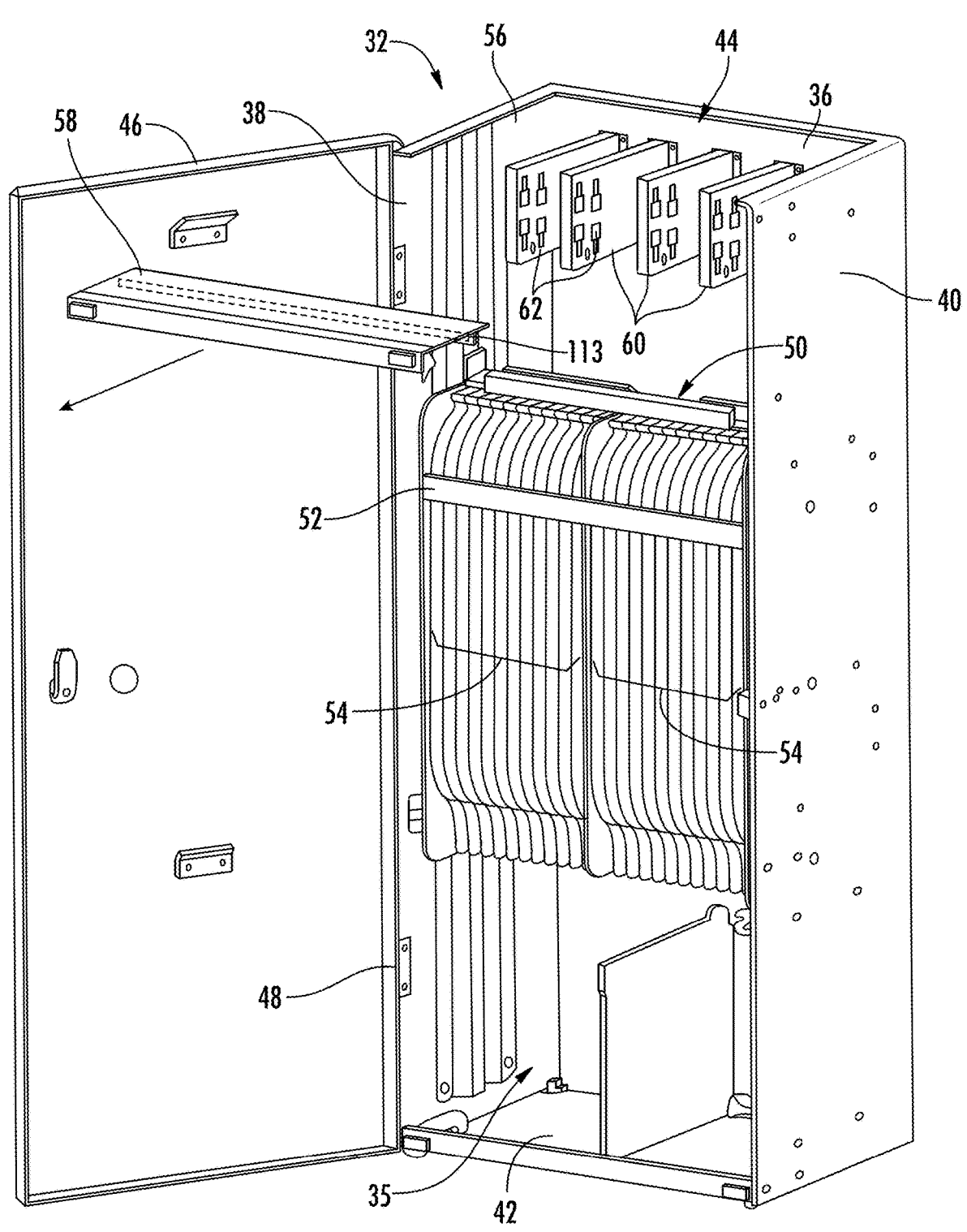
FIGS. 3A-3D illustrate a method of assembling a cable covering assembly with the cable covering of FIG. 3 onto the distribution cabinet.
Figure 3B:
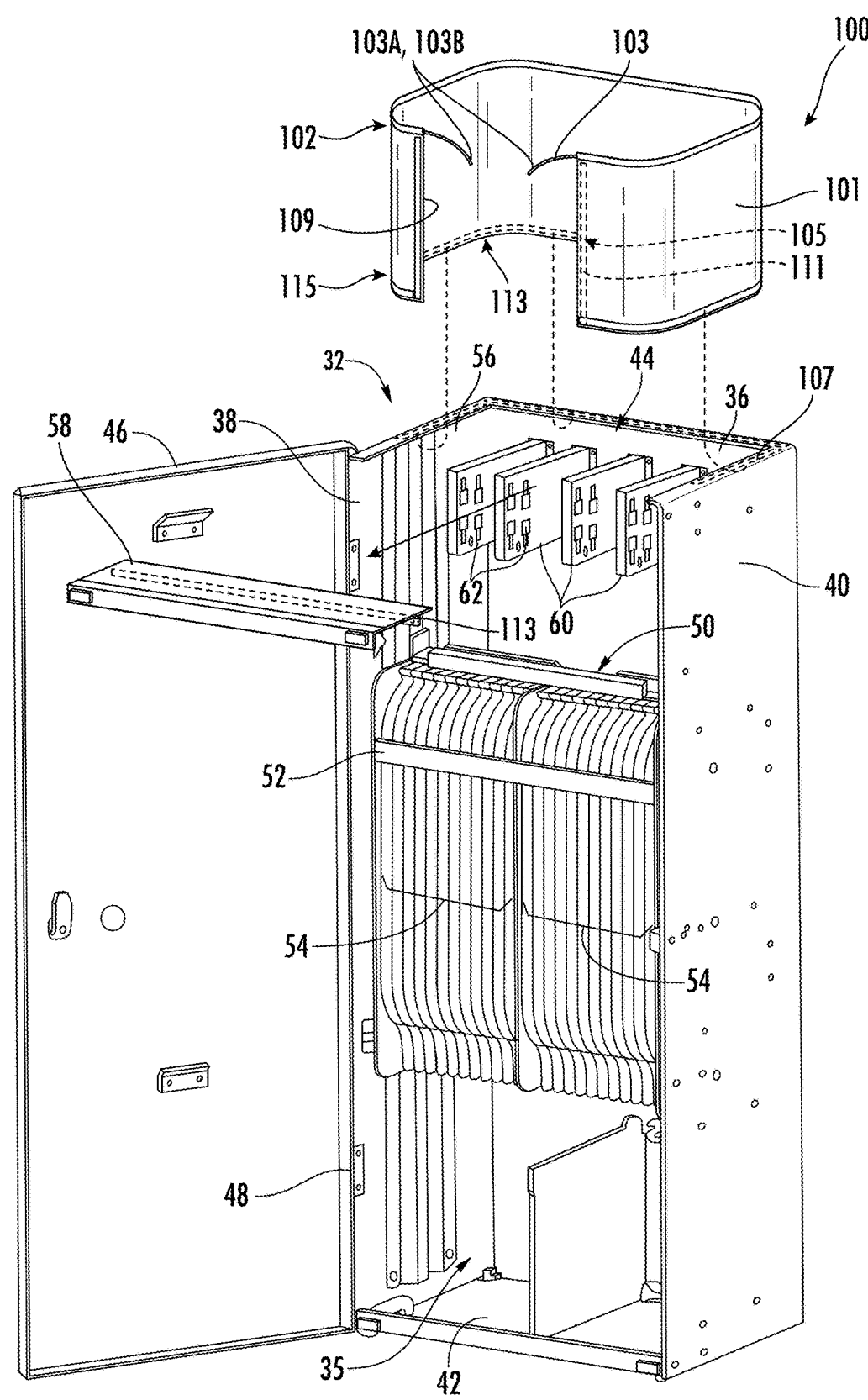
Figure 3C:
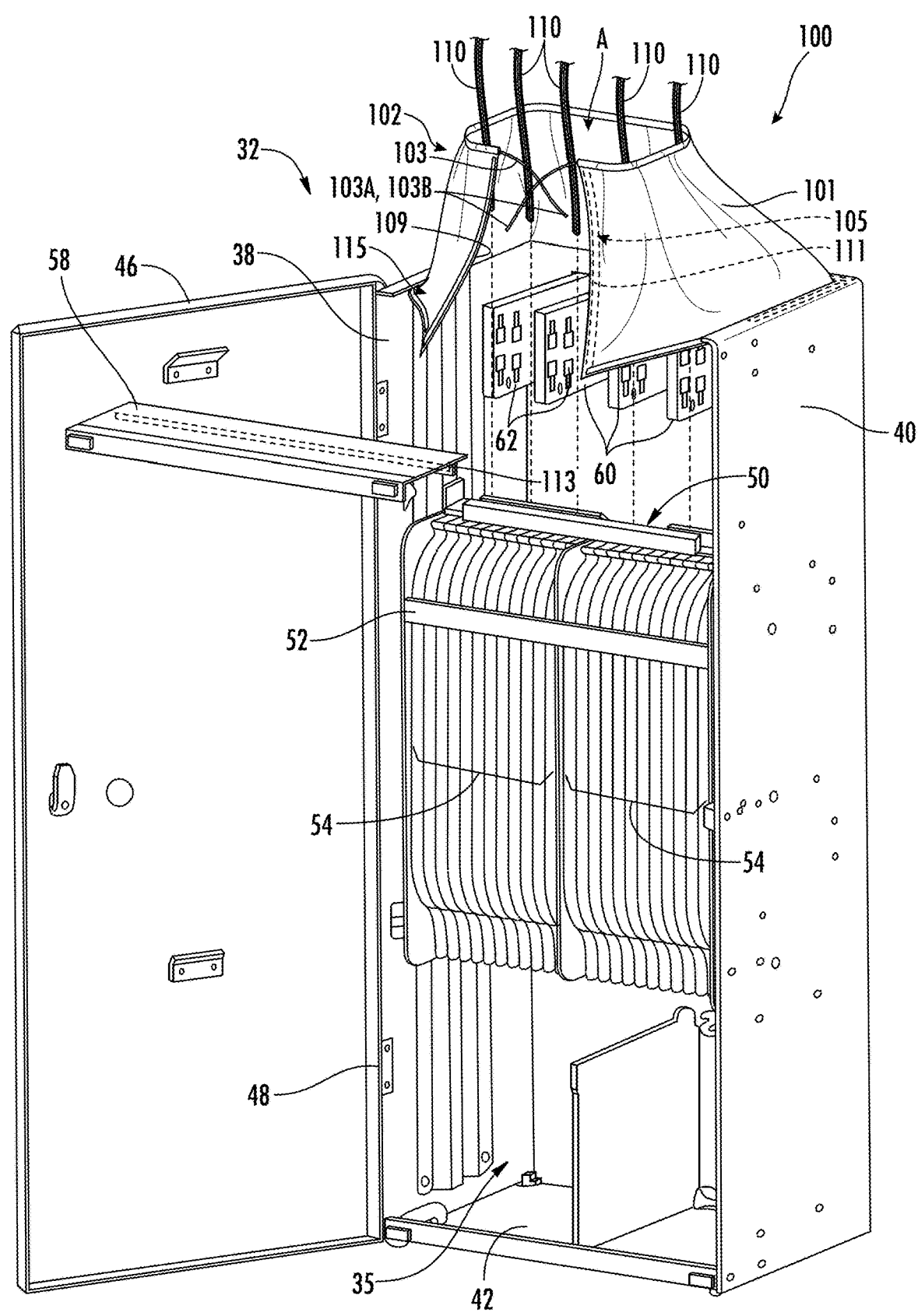
Figure 3D:
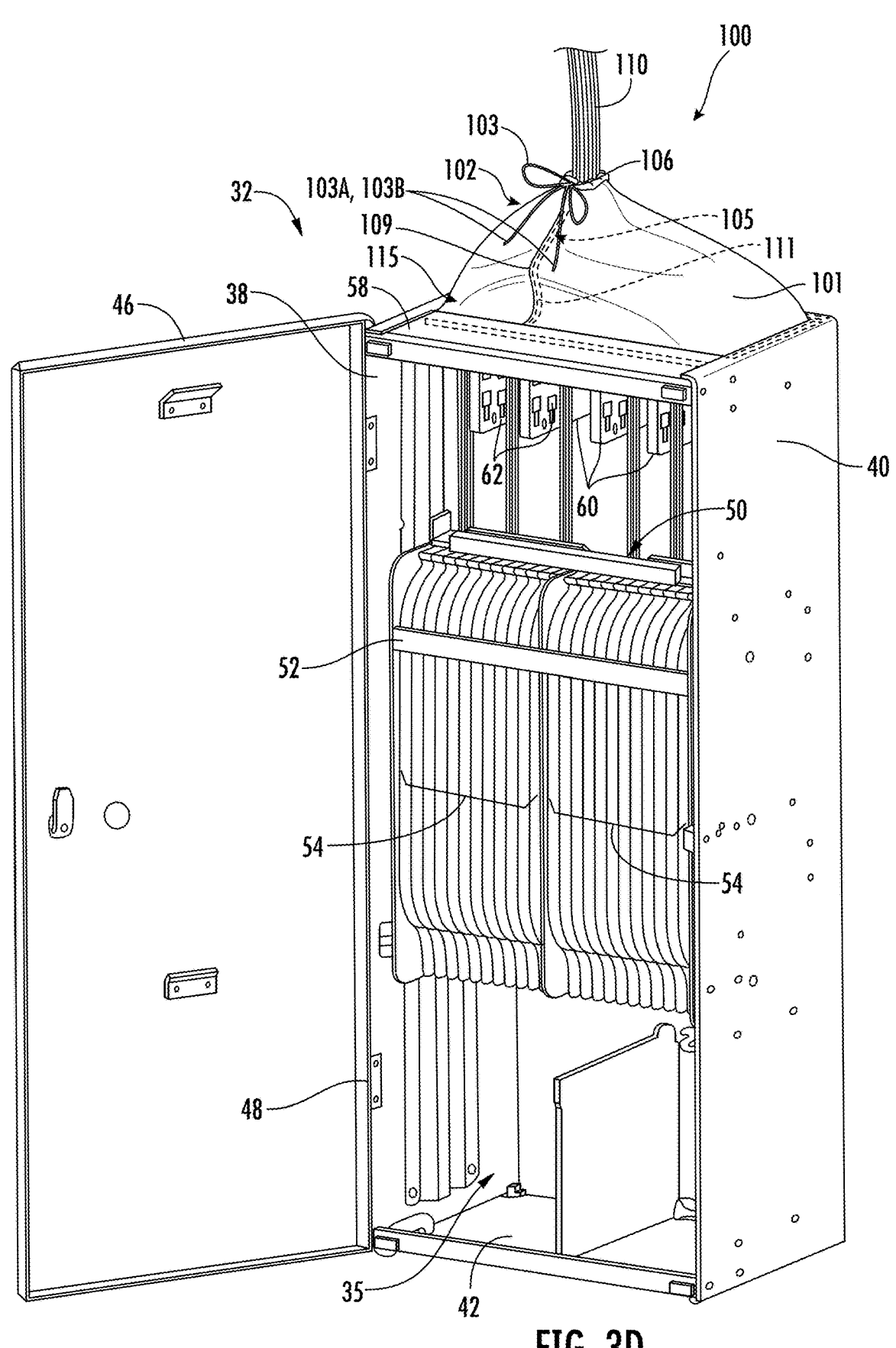

Referring now to FIGS. 3A-3D, a method of assembling a cable covering assembly by applying covering 100 onto distribution cabinet 32 is shown. To apply covering 100 onto distribution cabinet 32, front plate 58 is slidably removed from cabinet 32 as shown in FIG. 3A. Then, covering 100 is attached to distribution cabinet 32 via the cabinet attachment mechanism 107 as shown in FIG. 3B. In particular, the fasteners 113 on bottom portion 115 of sheet 101 are coupled to the rear wall 36, first side wall 38, and second side wall 40. As shown, when covering 100 is attached, there is an open area A for insertion of trunk cables 110 to pass through into distribution cabinet 32. Then, as shown in FIG. 3C, trunk cables 110 are inserted through the open area A into distribution cabinet 32. As shown, trunk cables 110 are inserted from above rear plate 56 (FIG. 2). After insertion of trunk cables 110, sheet 101 of covering 100 is wrapped around the trunk cables 110 where a portion of sheet 101 overlaps with itself to define overlap region 109 as shown in FIG. 3D. In the overlap region 109, coupler 111 of self-attachment mechanism 105 secures sheet 101 about the circumference or perimeter of trunk cables 110. String 103 is then actuated or pulled by the ends 103A, 103B of string 103 and knot 106 is tied to tighten top portion 102 of sheet 101 around a perimeter or circumference of trunk cables 110. In some embodiments, after knot 106 is tied, string 103 and knot 106 is fed through area A to conceal string 103 and knot 106. Front plate 58 is then slidably inserted into distribution cabinet 32 where fastener 113 couples to front plate 58 as also shown in FIG. 3D thereby completing installation of covering onto distribution cabinet 32.

Covering 200

Referring now to FIG. 4, a second embodiment of cable covering 200 is provided. As shown, in this embodiment, there are three groups of trunk cables 110 that are inserted into distribution cabinet 32, and there are three corresponding coverings 200A, 200B, 200C with three corresponding sheets 201. For ease in discussion and clarity, a single cable covering 200 will be described unless noted otherwise herein. Cable covering 200 comprises a sheet 201, a self-attachment mechanism 203, and a cabinet attachment mechanism 205. As shown, sheet 201 is configured to span the perimeter or circumference of a group of trunk cables 110 that are inserted into distribution cabinet 32. In some embodiments, sheet 201 is made of an aramid material. However, it is within the scope of the present disclosure that alternate suitable materials such as canvas or cloth like materials, for example, may be used.

As shown in FIG. 4, sheet 201 surrounds trunk cables 110, and sheet 201 overlaps onto itself to define an overlap region 207 where self-attachment mechanism 203 is configured to sheet 201, thereby enclosing sheet 201 onto entering trunk cable(s) 110. In particular, self-attachment mechanism 203 comprises a plurality of couplers 209 that extend across overlap region 207 and aids in closing sheet 101 around a perimeter or circumference of trunk cable(s) 110 to prevent debris and/or dust from accumulating within distribution cabinet 32 and/or interacting with cables 110. As shown, in this embodiment, couplers 209 comprises three fabric fasteners or lineal fabric strips (e.g., Velcro) which are spaced apart along a height H of covering 200. In this embodiment, one of couplers 209 is positioned near top portion 215, another coupler 209 is positioned near bottom portion 213, and a third coupler 209 positioned between top portion 215 and bottom portion 213. When enclosing trunk cables 110 within coverings 200A-200C, tightening couplers 209 enable a seal throughout the height H of covering 200 to prevent dust and debris from entering trunk cable 110 or distribution cabinet 32. In some embodiments, coupler 209 of self-attachment mechanism 203 comprises a fabric fastener (e.g., Velcro) where lineal fabric strips are attached to opposing surfaces of sheet 201 and extend across overlap region 207 to enclose sheet 201.

Self-attachment mechanism 203 further comprises internal fasteners 2113 that are configured to couple a middle covering 200B to side coverings 200A, 200C. Internal fasteners 2113 comprise a fabric fastener where lineal fabric strips are attached to sheet 201 of the side coverings 200A, 200C and to sheet 201 of the middle covering 2006. In this embodiment, the lineal strips applied on sheet 201 of the side coverings 200A, 200C adjacent to the first side wall 38 or the second side wall 40 are attached onto the corresponding lineal strip of sheet 201 on the middle covering 200B to couple the coverings 200A, 2006, 200C together.

Cabinet attachment mechanism 205 comprises a ramp 202 and a fastener 211. Ramp 202 is configured to provide a mounting surface on which coverings 200 can be mounted and is configured to couple to distribution cabinet 32 thereby operably coupling coverings 200 to distribution cabinet 32. As shown, ramp 202 is U-shaped to match with side walls 38, 40 and rear wall 36. Ramp 202 includes a flange 205 on a base portion 206 where the flange 205 and the base portion 206 defines an opening 204. To couple covering 200 to ramp 202, a portion of sheet 201 of covering 200 can be fed through opening 204, fed around flange 205, and attached onto another portion of sheet 201 via side fasteners 211A. In particular, side fasteners 211A comprise a fabric fastener where lineal fabric strips are attached to the sheet 201 such that fasteners 211A are fed through opening 204 of ramp 202 and the lineal fabric strips attach onto sheet 201 as shown.

Fastener 211 of cabinet attachment mechanism 205 is configured to attach covering 200 to front plate 58 of distribution cabinet 32. In some embodiments, fastener 211 comprises a fabric fastener where lineal fabric strips are attached to the bottom portion 213 of sheet 201 and to front plate 58. In this embodiment, the lineal strips applied onto bottom portion 213 of sheet 201 are applied onto the corresponding lineal strip of front plate 58 to thereby couple covering 200 to distribution cabinet 32.

In this embodiment, fabric fasteners are described. However, it is within the scope of the present disclosure that alternate suitable fastening methods may be used, such as hook and loop fasteners, hook and pile fasteners, touch fasteners, or the like, for example.

Figure 4A:
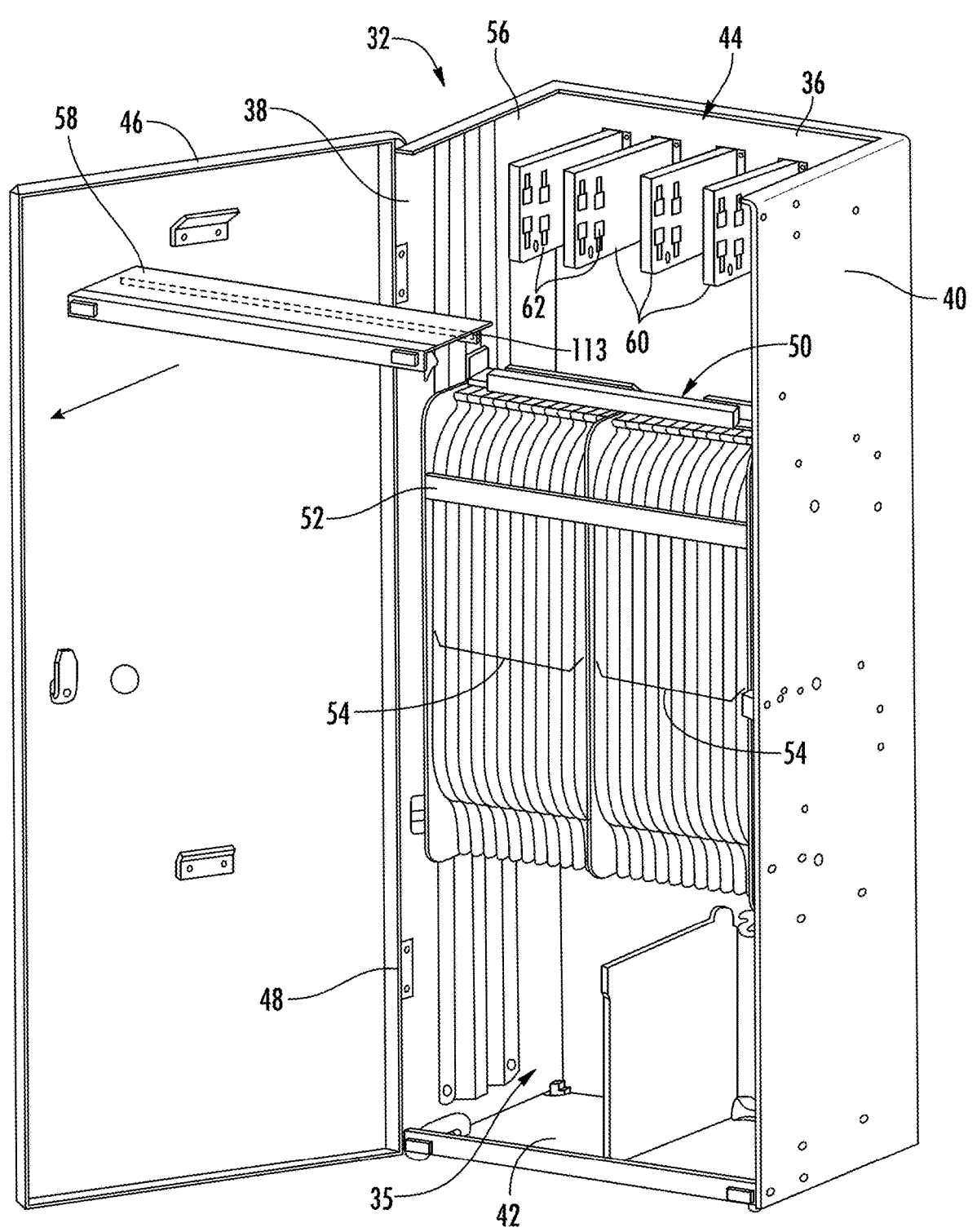
FIG. 4A-4F illustrate a method of assembling a cable covering assembly with the cable covering of FIG. 4 onto the distribution cabinet.
Figure 4B:
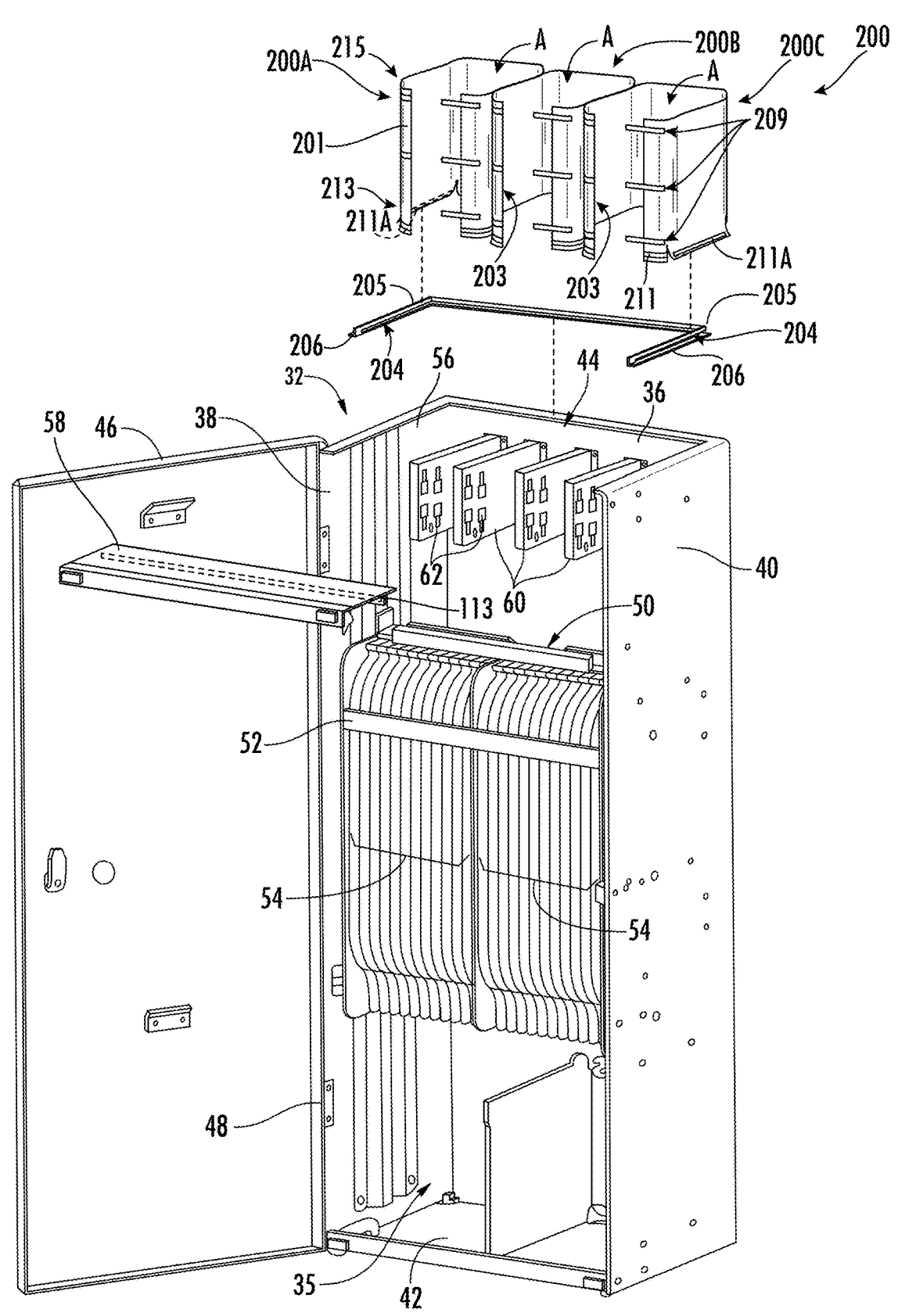
Figure 4C:
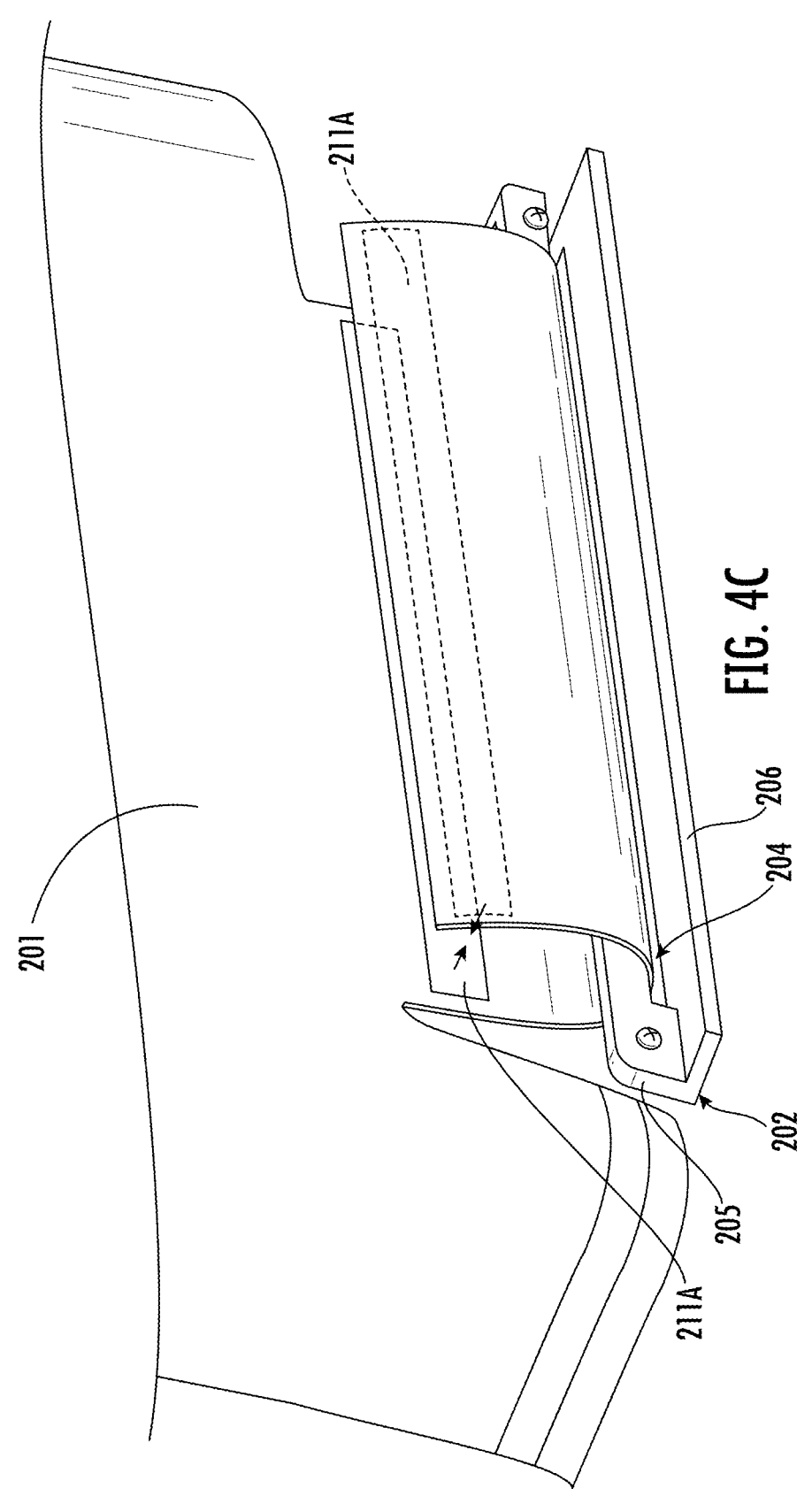
Figure 4D:
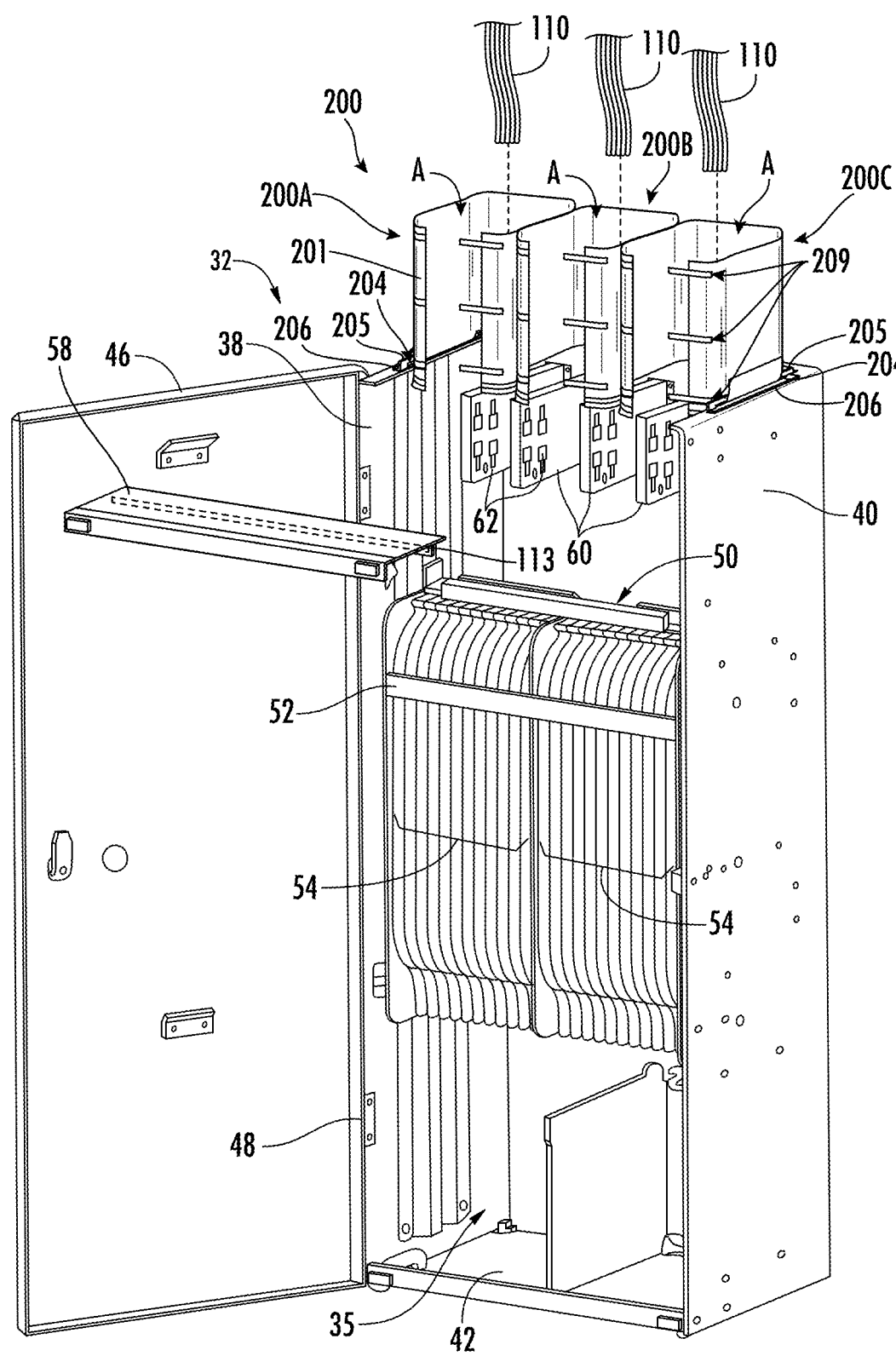
Figure 4E:
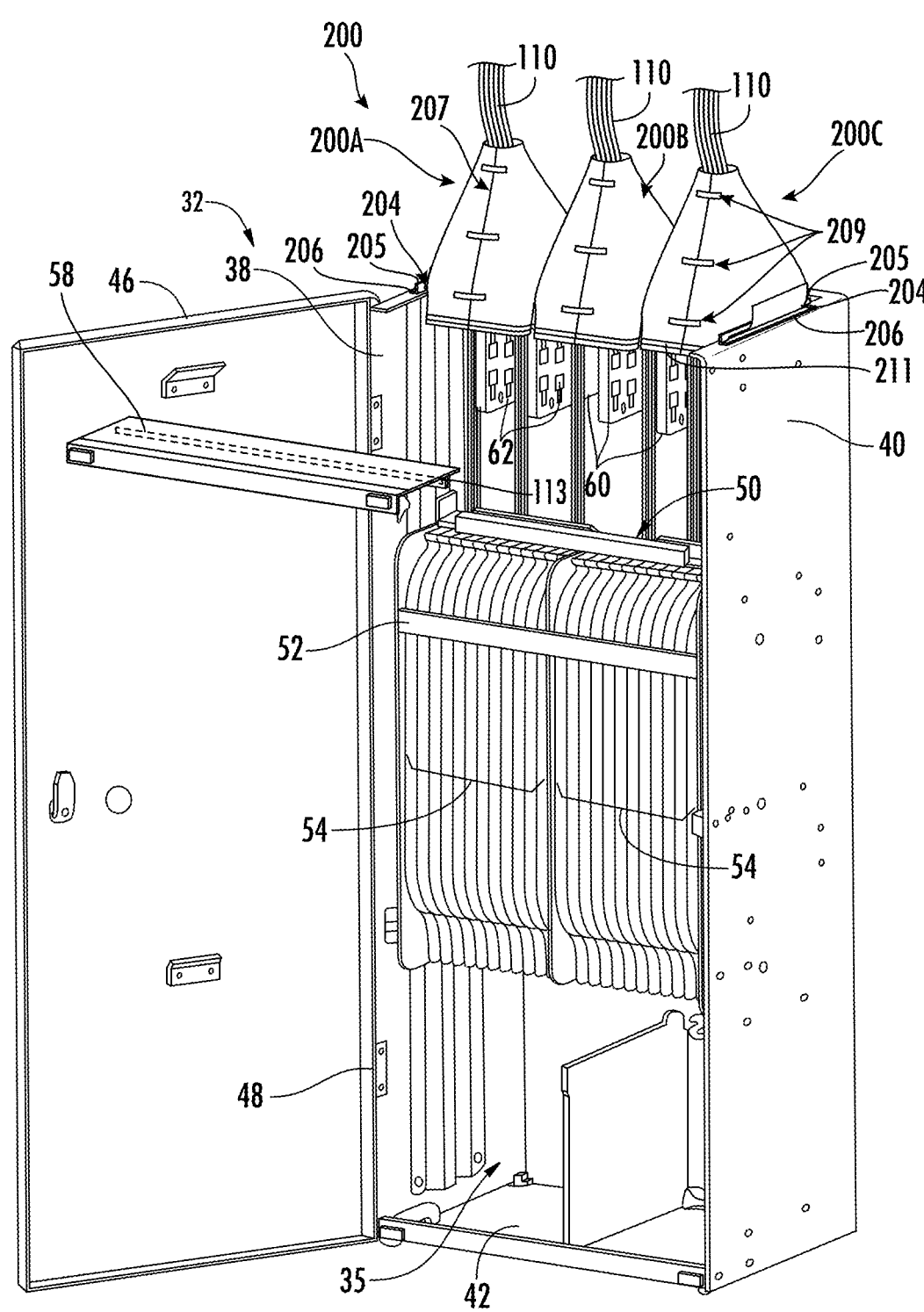
Figure 4F:
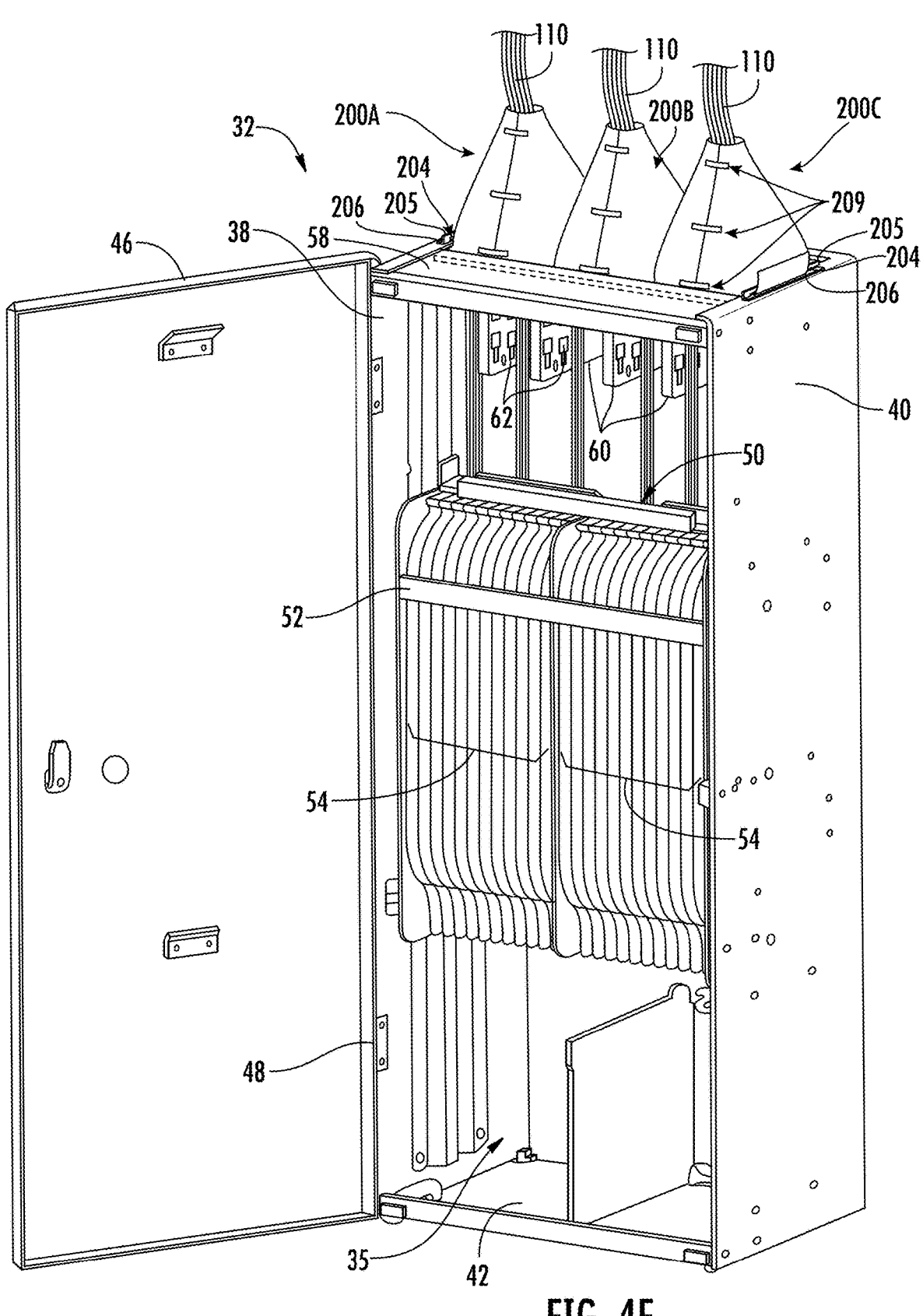

Referring now to FIGS. 4A-4F, a method of assembling a cable covering assembly by applying covering 200 onto distribution covering 32 is provided. To apply covering 200 onto distribution cabinet 32, front plate 58 is first slidably removed from cabinet 32 as shown in FIG. 4A. Then, side coverings 200A, 200C are attached to ramp 202 (FIG. 4B) as discussed above—a portion of sheet 201 of coverings 200A, 200C is fed through opening 204, fed around flange 205, and attached onto sheet 201 via side fasteners 211A as shown in FIG. 4C. In addition, internal fasteners 211B are used to couple the middle covering 200B to the side coverings 200A, 200C as described above. As shown in FIGS. 4B and 4D, when coverings 200A-200C are coupled to ramp 202, there is an open area A in coverings 200A, 200B, 200C for insertion of trunk cables 110 to pass through and into distribution cabinet 32. Ramp 202 with coverings 200 attached thereto is then coupled to distribution cabinet 32 as shown in FIG. 4D. In some embodiments, ramp 202 is screwed onto distribution cabinet as shown. However, it is within the scope of the present disclosure that alternate coupling methods may be used. Then, trunk cables 110 are inserted into distribution cabinet 32 as also shown in FIG. 4D. As shown, trunk cables 110 are inserted from above rear plate 56 (FIG. 2), and the inserted trunk cables 110 are sorted into three groups corresponding to the three coverings 200A-200C shown. After insertion of trunk cables 110, sheets 201 of coverings 200 (coverings 200A, 200B, 200C) are wrapped around the corresponding groupings of trunk cables 110 where a portion of sheet 201 overlaps with itself to define the overlap region 207. In the overlap region 207, the plurality of adhesives 209 of self-attachment mechanism 203 secures sheets 201 of coverings 200 about the circumference or perimeter of the group of trunk cables 110 as shown in FIG. 4E. Front plate 58 is then slidably inserted into distribution cabinet 32 fastener 211 couples to front plate 58 as shown in FIGS. 4E and 4F thereby completing the installation of coverings 200 onto distribution cabinet 32.

Covering 300

Referring now to FIG. 5, a third embodiment of cable covering 300 is provided. As shown, in this embodiment, there are three groups of trunk cables 110 that are inserted into distribution cabinet 32, and there are three corresponding coverings 300A, 300B, 300C with three corresponding sheets 301. In this embodiment, coverings 300A, 300B, 300C are stitched together. For ease in discussion and clarity, a single cable covering 300 will be described unless noted otherwise herein. Cable covering 300 comprises a sheet 301, a string 303 embedded within sheet 301, and a cabinet attachment mechanism 305. As shown, sheet 301 is configured to span the perimeter or circumference of a group of trunk cables 110 that are inserted into distribution cabinet 32. In some embodiments, sheet 301 is made of an aramid material. However, it is within the scope of the present disclosure that alternate suitable materials such as canvas or cloth like materials, for example, may be used.

As shown in FIG. 5, sheet 301 surrounds entering trunk cables 110, and sheet 301 includes a fastener 308 to close sheet 301 and thereby enclose the entering trunk cable(s) 110 around a perimeter or circumference of trunk cable(s) 110 to prevent debris and/or dust from accumulating within distribution cabinet 32 and/or interacting with cables 110. In this embodiment, covering 300 includes fastener 308 positioned on edges 308A, 308B (FIG. 5B) of covering 300. To close covering 300, fastener 308 on edges 308A, 308B are coupled to each other (i.e., in threaded engagement), and fastener 308 is actuated wherein a handle 307 (FIG. 3B) is moved from a bottom portion 313 to a top portion 302 of covering 300. In some embodiments, fastener 308 comprises a zipper that extends along an entire height H of covering 300. In alternate embodiments, alternate suitable fasteners may be used for fastener 308.

As mentioned previously, string 303 is embedded within sheet 301 of coverings 300A-300C. String 303 is configured to tighten sheet 301 such that a top portion 302 of sheet 301 surrounds a perimeter or circumference of the entering trunk cable(s) 110. In particular, string 303 is actuated or pulled at both ends 303A, 303B, and a knot 306 is tied, which tightens sheet 301 around the entering trunk cable(s) 110. In this configuration, top portion 302 provides one layer of sealing protection for the trunk cable(s) 110 to prevent debris or dust from interacting with trunk cables 110 and entering distribution cabinet 32.

Cabinet attachment mechanism 305 comprises a ramp 202 and a fastener 311. Ramp 202 is configured to provide a surface on which coverings 300 can be mounted and is configured to couple to distribution cabinet 32 thereby operably coupling coverings 300 to distribution cabinet 32. As shown, ramp 202 includes a flange 205 on a base portion 206 where the flange 205 and the base portion 206 define an opening 204 through which a portion of sheet 301 of covering 300 can be fed and attached onto a portion of sheet 301 via side fasteners 311A. In this embodiment, side fasteners 311A are positioned on covering 300 such that side fasteners 311A couple to ramp 202 and fasten to each other on the interior of covering 300 or opposite exterior surface 306 of covering 300. As such, when installing covering 300 onto ramp 202, a portion of covering 300 is routed above flange 205 and through opening 204 where side fasteners 311A are coupled to covering 300 on the interior of covering 300 opposite exterior surface 306 as shown in FIG. 5C.

Cabinet attachment mechanism 305 further comprises fastener 311 that is configured to attach covering 300 to front plate 58 of distribution cabinet 32. In particular, in some embodiments, fastener 311 comprises a plurality of magnets 312 embedded within sheet 301 in a bottom portion 313 to thereby couple covering 300 to distribution cabinet 32. However, it is within the scope of the present embodiment, that alternate fasteners may be used to couple covering 300 to front plate 58, such as hook and loop fasteners, hook and pile fasteners, touch fasteners, or the like, for example.

Figure 5A:
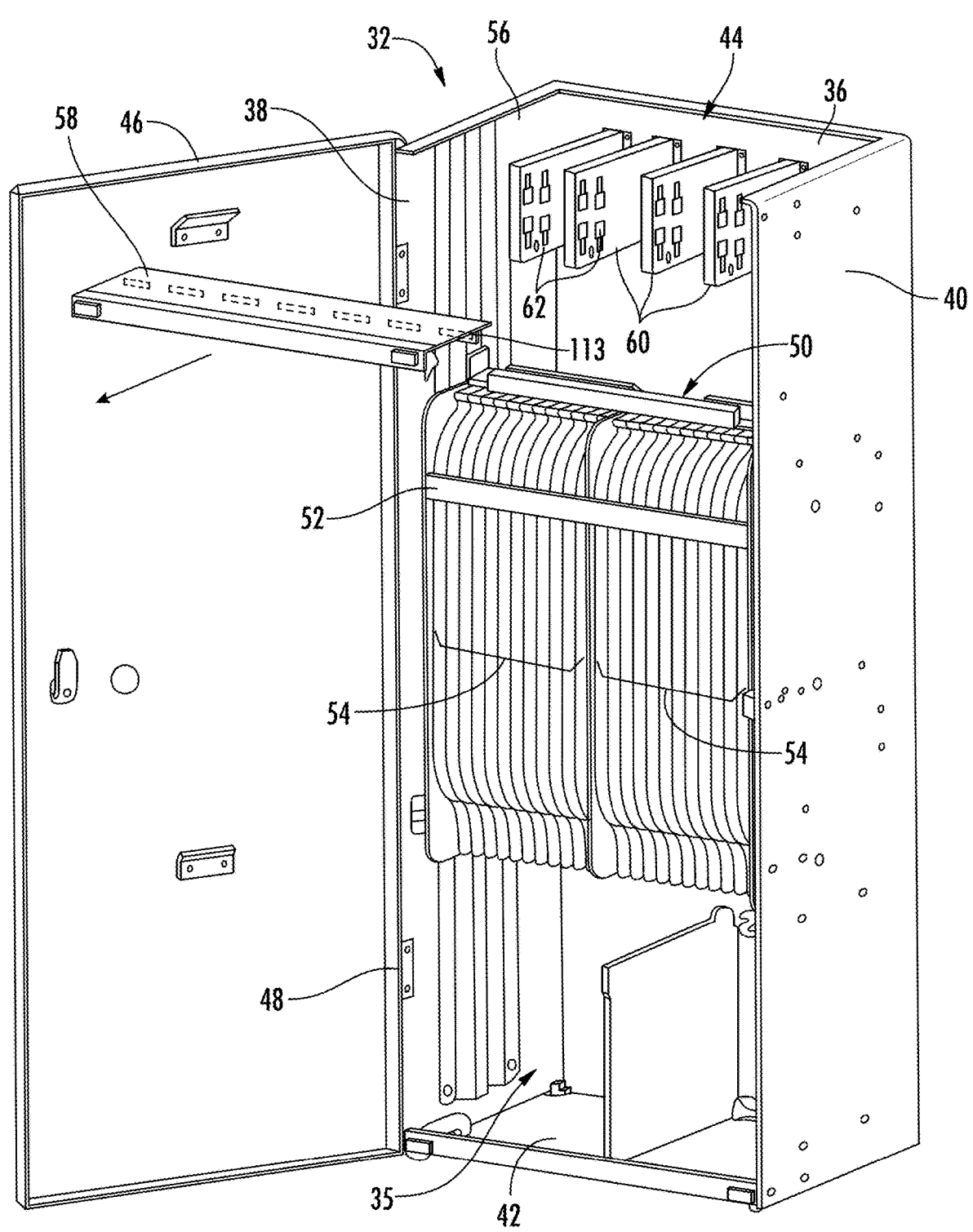
FIGS. 5A-5F illustrate a method of assembling a cable covering assembly with the covering of FIG. 5 onto the distribution cabinet.
Figure 5B:
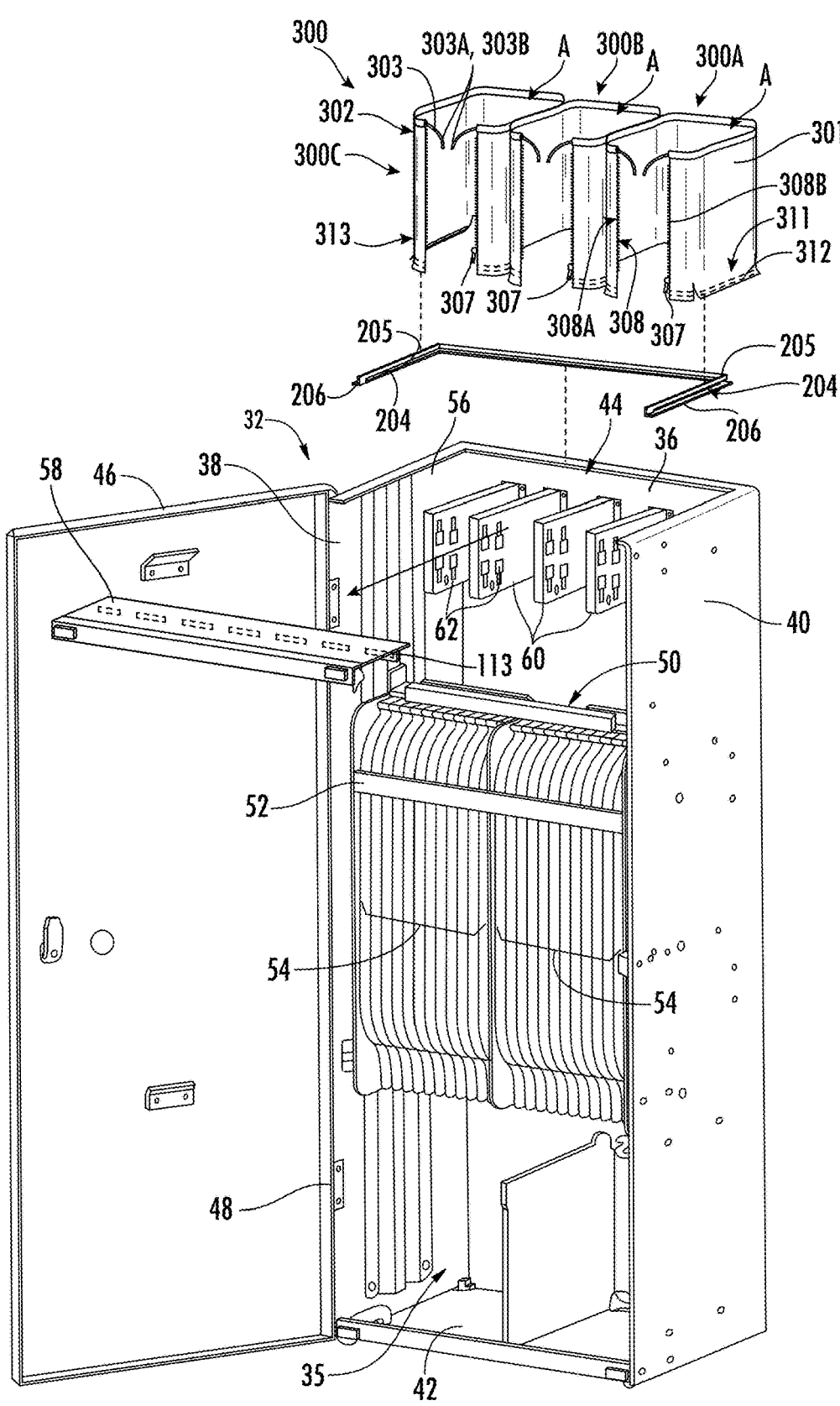
Figure 5C:
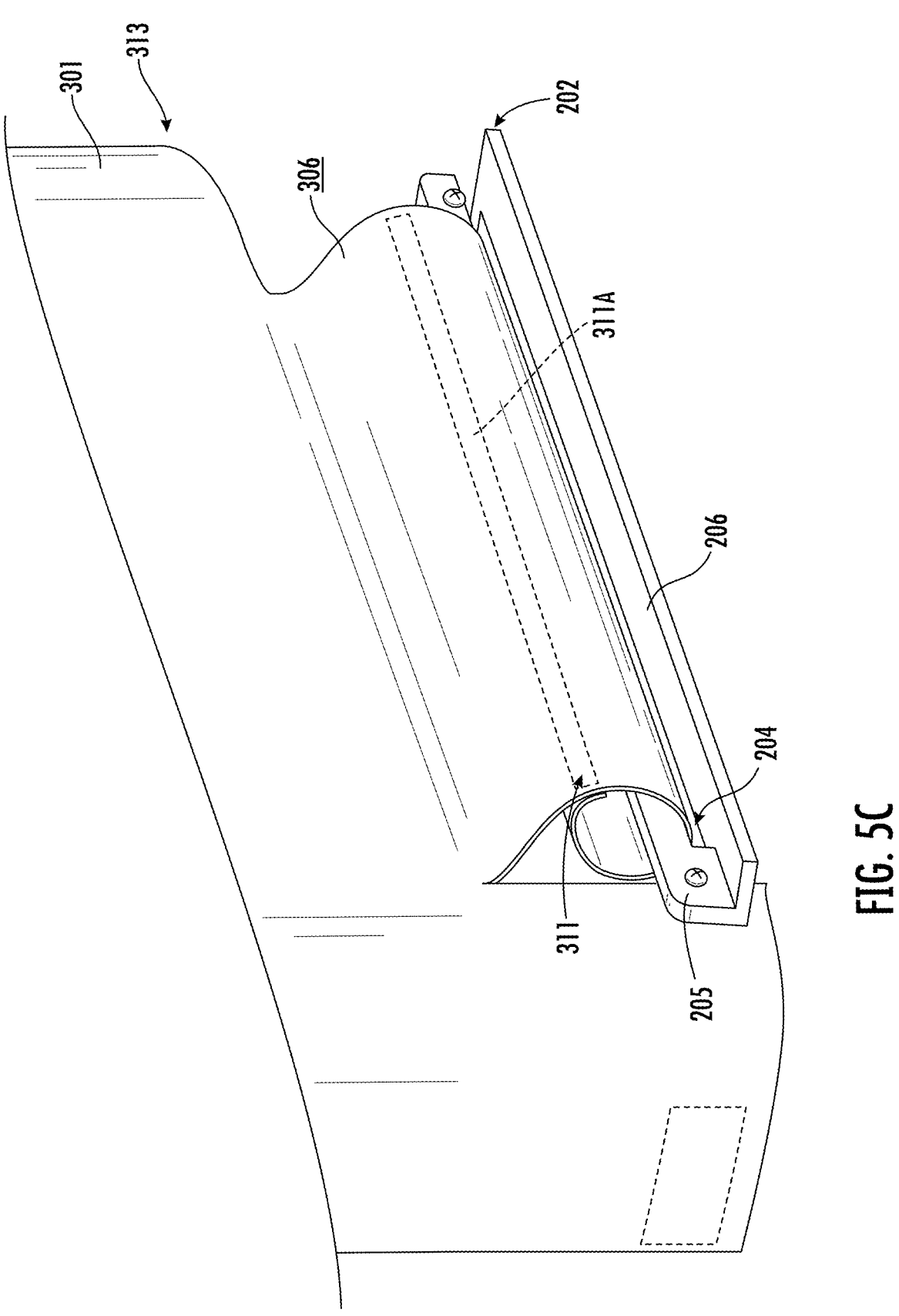
Figure 5D:
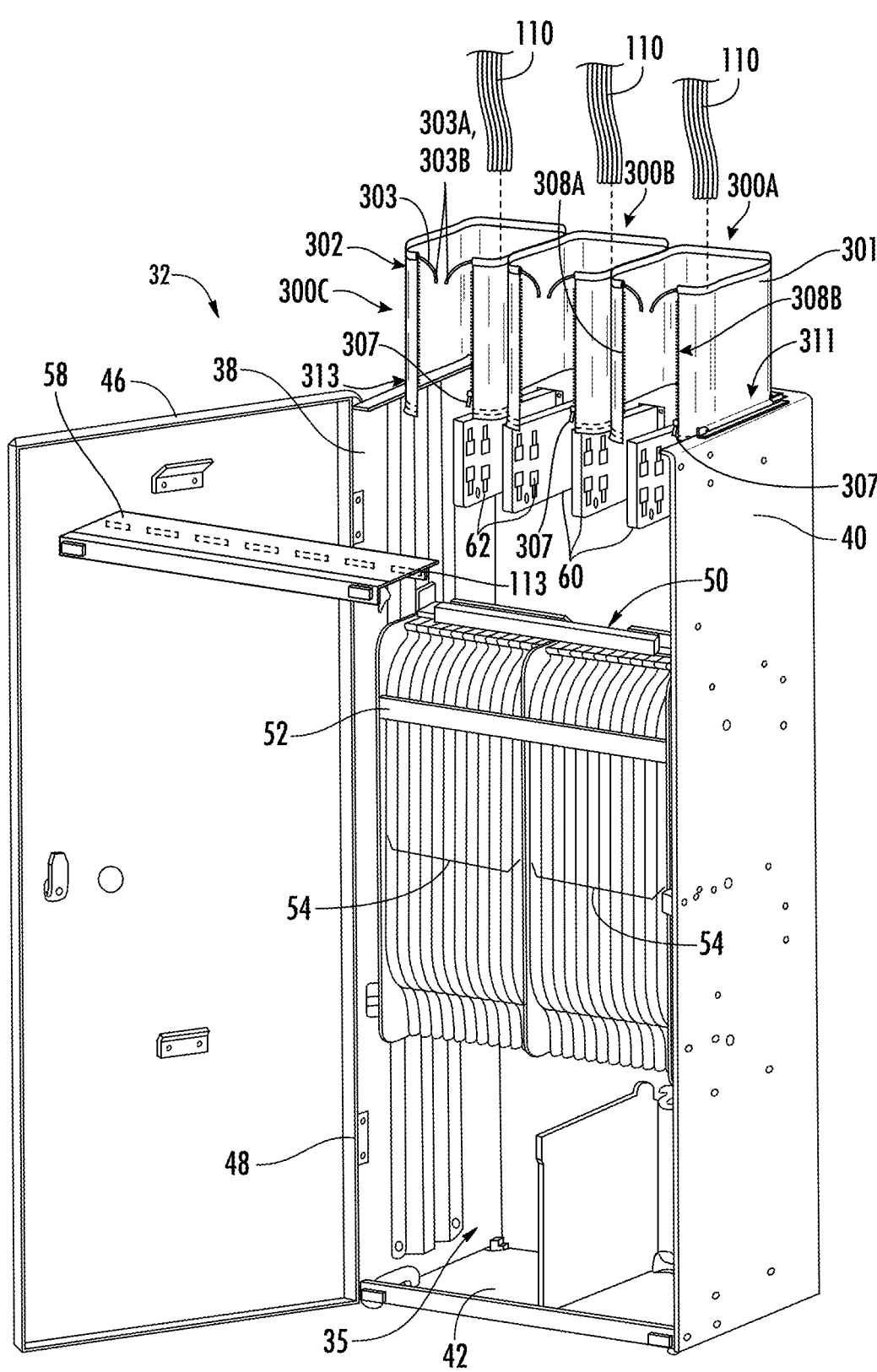
Figure 5E:
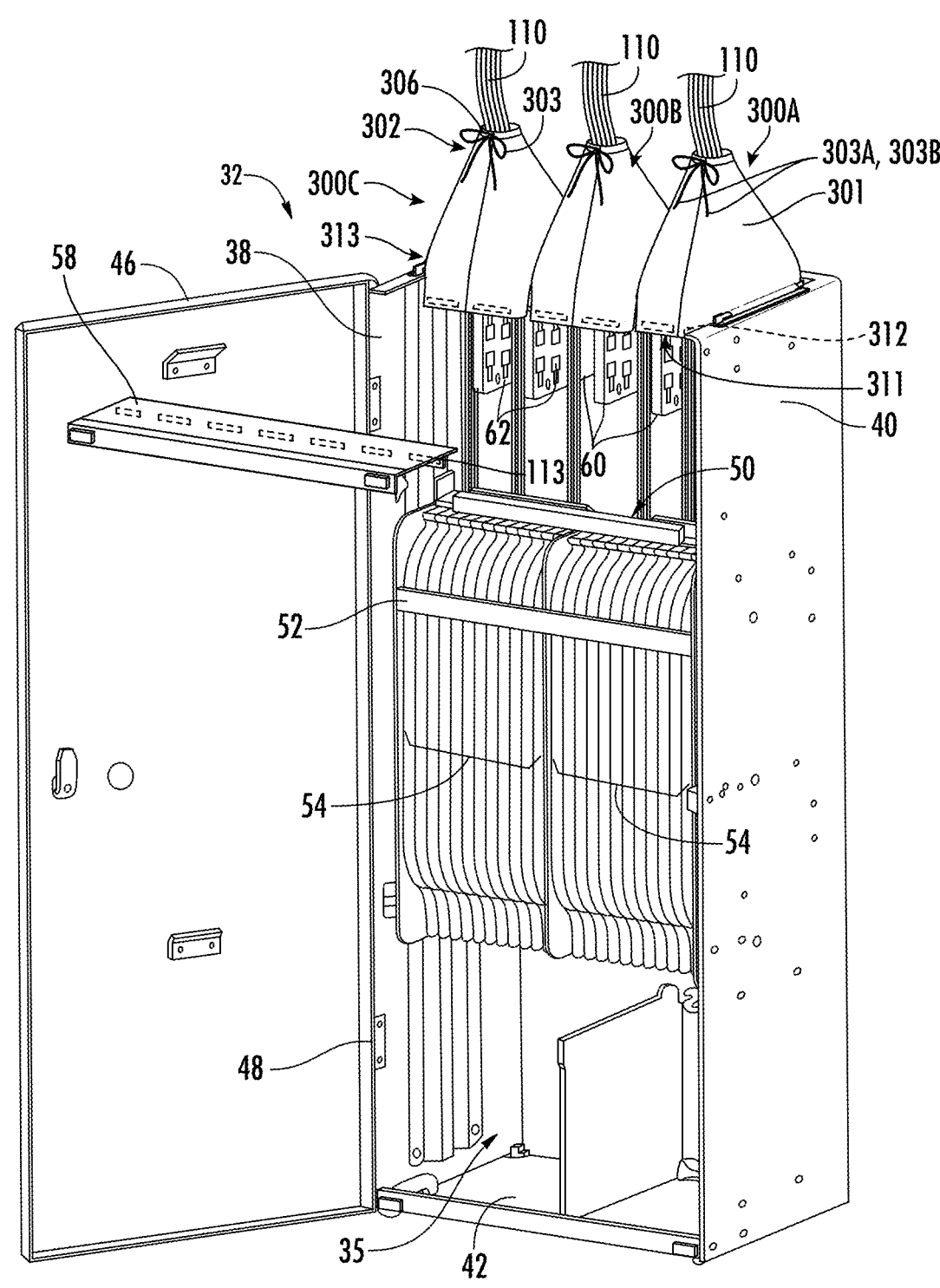
Figure 5F:
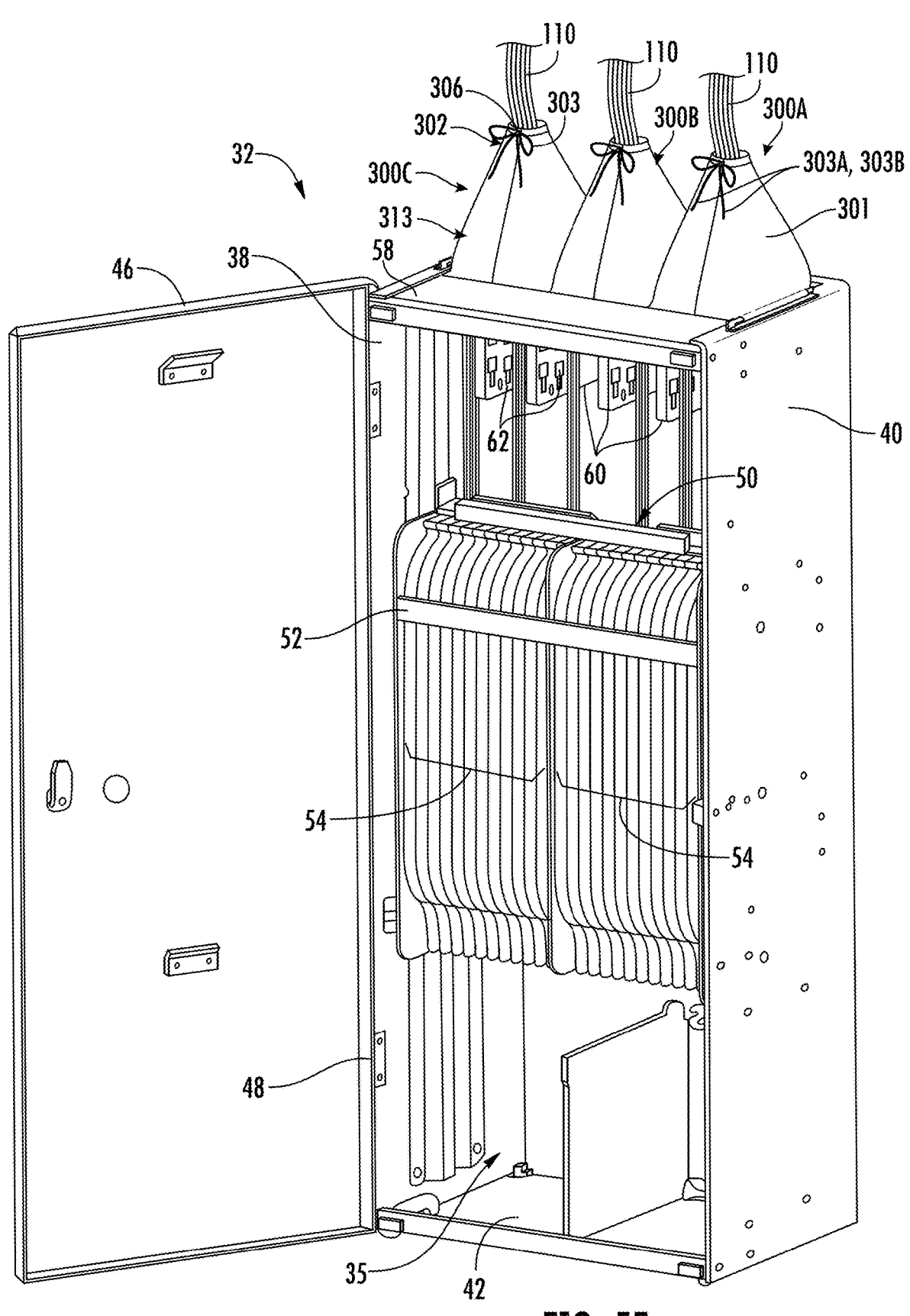

Referring now to FIGS. 5A-5F, a method for assembling a cable covering assembly by applying covering 300 onto distribution cabinet 32 is provided. To apply covering 300 onto distribution cabinet 32, front plate 58 is slidably removed from cabinet 32 as shown in FIG. 5A. Then, coverings 300A-300C are first attached to ramp 202 as shown in FIGS. 5B and 5C where a portion of sheet 301 of coverings 300A, 300C is fed over flange 205, fed through opening 204, and attached onto sheet 301 on an interior side of covering 300 opposite exterior surface 306 of covering 300. As shown, when coverings 300A-300C are coupled to ramp 202, there is an open area A to allow trunk cables 110 to enter distribution cabinet 32 as discussed below. Then, as shown in FIG. 5D, ramp 202 with coverings 300 attached thereto is coupled to distribution cabinet 32. In some embodiments, ramp 202 is screwed onto distribution cabinet as shown. However, it is within the scope of the present disclosure that alternate coupling methods may be used. Trunk cables 110 are then inserted into distribution cabinet 32 as also shown in FIG. 5D. As shown, trunk cables 110 are inserted from above rear plate 56 (FIG. 2), and inserted trunk cables 110 are sorted into three groups corresponding to the three coverings 300A-300C shown. After insertion of trunk cables 110, sheets 301 of coverings 300 are wrapped around the corresponding groupings of trunk cables 110, and fastener 308 is actuated to close coverings 300A-300C around the groupings of trunk cables 110 as shown in FIG. 5E. Then, string 303 is pulled by the ends 303A, 303B of string 303 and knot 306 is tied to tighten a top portion 307 of sheet 101 around a perimeter or circumference of trunk cables 110 as also shown in FIG. 5E. In some embodiments, after knot 306 is tied, string 303 and knot 306 is fed through area A to conceal string 303 and knot 306. Front plate 58 is then slidably inserted into distribution cabinet 32 where fastener 311 (e.g., magnets 312) couples to front plate 58 as shown in FIG. 5F thereby completing installation of covering onto distribution cabinet 32.

It will be apparent to those skilled in the art that various modifications to the preferred embodiments of the disclosure as described herein can be made without departing from the spirit or scope of the disclosure as defined in the appended claims.

Thus, the disclosure covers the modifications and variations provided they come within the scope of the appended claims and the equivalents thereto.

What is claimed is:

1. A cable covering assembly comprising:
   a cable covering comprising:
      a sheet having a top portion, a bottom portion, a first edge, and a second edge coupled to the first edge;
      a string embedded within a top portion of the sheet, wherein the string is operably coupled to the top portion of the sheet;
      a first fastener embedded within the bottom portion of the sheet;
         wherein the first fastener includes a side fastener; and a second fastener attached to the first edge and the second edge of the sheet, wherein the second fastener couples the first edge to the second edge to close the cable covering:

a cabinet attachment mechanism comprising:

a ramp having a base portion with a flange extending therefrom to define an opening;

wherein the side fastener is inserted through the opening, around the flange, and attached onto the sheet such that the cable covering is secured onto the ramp.

2. The cable covering assembly of claim 1, wherein the string can be tensioned to tie a knot to tighten the top portion of the sheet.

3. The cable covering assembly of claim 1, wherein the first fastener is a magnet and the second fastener is a zipper.

4. The cable covering assembly of claim 1, wherein the sheet is made of an aramid material.

5. The cable covering assembly of claim 1, wherein the cable covering comprises a plurality of cable coverings coupled to each other.

6. The cable covering assembly of claim 5, wherein the plurality of cable coverings comprises:

a first side covering;

a second side covering;

a middle covering positioned between the first side covering and the second side covering, the middle covering coupled to the first side covering and the second side covering.

7. A cable covering assembly comprising:

a distribution cabinet comprising:

a first side wall;

a second side wall; and a rear wall coupled to the first side wall and the second side wall;

a covering coupled to the distribution cabinet comprising:

a sheet having a top portion, a bottom portion, a first edge, and a second edge coupled to the first edge;

a string embedded within a top portion of the sheet, wherein the string is operably coupled to the top portion of the sheet;

a first fastener embedded within the bottom portion of the sheet; and a second fastener attached to the first edge and the second edge of the sheet, wherein the second fastener couples the first edge to the second edge to close the cable covering;

a cabinet attachment mechanism that couples to the distribution cabinet and the covering, the cabinet attachment mechanism comprising:

a ramp having a base portion with a flange extending therefrom to define an opening;

wherein the side fastener is inserted through the opening, around the flange, and attached onto the sheet such that the cable covering is secured onto the ramp.

8. The cable covering assembly of claim 7, wherein the covering is coupled to a ramp, the ramp including an opening through which the sheet is fed.

9. The cable covering assembly of claim 7, wherein the string can be tensioned to tie a knot to tighten the top portion of the sheet.

10. The cable covering assembly of claim 7, wherein the first fastener is a magnet and the second fastener is a zipper.

11. The cable covering assembly of claim 7, wherein the sheet is made of an aramid material.

12. The cable covering assembly of claim 7, wherein the cable covering comprises a plurality of cable coverings coupled to each other, wherein the plurality of cable coverings comprises:

a first side covering;

a second side covering;

a middle covering positioned between the first side covering and the second side covering, the middle covering coupled to the first side covering and the second side covering.

13. The cable covering assembly of claim 12, further comprising a plurality of trunk cables inserted into the distribution cabinet, wherein the plurality of trunk cables is separated into a first group, a second group, and a third group.

14. The cable covering assembly of claim 13, wherein the first group of trunk cables corresponds to the first side covering, the second group of trunk cables corresponds to the middle covering, and the third group of trunk cables corresponds to the second side covering.

15. A method of assembling a cable covering assembly, wherein the cable covering assembly comprises: a cable covering comprising: a sheet having a top portion, a bottom portion, a first edge, and a second edge coupled to the first edge; a string embedded within a top portion of the sheet, wherein the string is operably coupled to the top portion of the sheet; a first fastener embedded within the bottom portion of the sheet; and a second fastener attached to the first edge and the second edge of the sheet, the method comprising:

inserting the cable covering onto a ramp;

coupling the ramp and the cable covering to a distribution cabinet;

wherein the cable covering is coupled to the distribution cabinet by coupling the cable covering to a cabinet attachment mechanism, the cabinet attachment mechanism comprising:

a ramp having a base portion with a flange extending therefrom to define an opening;

wherein the first fastener is inserted through the opening, around the flange, and attached onto the sheet such that the cable covering is secured onto the ramp;

inserting a plurality of trunk cables into distribution cabinet;

closing the cable covering around the plurality of trunk cables by actuating the second fastener to couple the first edge to the second edge to close the cable covering; and tensioning the string and tying a knot to tighten the cable covering around the plurality of trunk cables.

16. The method of claim 15, wherein the cable covering comprises a plurality of cable coverings coupled to each other, wherein the plurality of cable coverings comprises:

a first side covering;

a second side covering;

a middle covering positioned between the first side covering and the second side covering, the middle covering coupled to the first side covering and the second side covering.

17. The method of claim 16, wherein the plurality of trunk cables are separated into a first group, a second group, and a third group;

wherein the first group of trunk cables is housed in the first side covering, the second group of trunk cables is housed in the middle covering, and the third group of trunk cables is housed in the second side covering.

\* \* \* \* \*